United States Patent
Kosaki

(10) Patent No.: US 9,773,176 B2
(45) Date of Patent: *Sep. 26, 2017

(54) IMAGE PROCESSING APPARATUS AND IMAGE PROCESSING METHOD

(71) Applicant: TOSHIBA ALPINE AUTOMOTIVE TECHNOLOGY CORPORATION, Iwaki-shi (JP)

(72) Inventor: Masanori Kosaki, Iwaki (JP)

(73) Assignee: TOSHIBA ALPINE AUTOMOTIVE TECHNOLOGY CORPORATION, Iwaki-shi (JP)

(*) Notice: Subject to any disclaimer, the term of this patent is extended or adjusted under 35 U.S.C. 154(b) by 170 days.

This patent is subject to a terminal disclaimer.

(21) Appl. No.: 14/571,881

(22) Filed: Dec. 16, 2014

(65) Prior Publication Data

US 2015/0269449 A1  Sep. 24, 2015

(30) Foreign Application Priority Data

Mar. 24, 2014 (JP) ................. 2014-060738

(51) Int. Cl.
G06K 9/00 (2006.01)
G06K 9/46 (2006.01)
(Continued)

(52) U.S. Cl.
CPC ......... *G06K 9/00805* (2013.01); *B60R 11/04* (2013.01); *G06K 9/4609* (2013.01);
(Continued)

(58) Field of Classification Search
None
See application file for complete search history.

(56) References Cited

U.S. PATENT DOCUMENTS 8,331,653 B2 * 12/2012 Seki .................. G06T 7/74
382/103
2009/0257659 A1 * 10/2009 Suzuki .................. B60R 1/00
382/199
(Continued)

FOREIGN PATENT DOCUMENTS

JP  2010-44438  2/2010
JP  2010-55195  3/2010
JP  2012-164026  8/2012

OTHER PUBLICATIONS

Extended European Search Report issued Mar. 30, 2016 in Patent Application No. 14199273.5.
(Continued)

*Primary Examiner* — Tsung-Yin Tsai
(74) *Attorney, Agent, or Firm* — Oblon, McClelland, Maier & Neustadt, L.L.P.

(57) ABSTRACT

According to one embodiment, an image processing apparatus and an image processing method includes a processed image generation unit, a provisional detection unit, and a final detection unit. The processed image generation unit generates a processed image for detection processing from an image around a vehicle taken by a camera provided on the vehicle. The provisional detection unit scans a scanning frame of a predetermined size according to a detection target object on the processed image, and detects a plurality of position candidate regions of the detection target object within the processed image by determining a feature value for respective scanning positions using a dictionary of the detection target object. The final detection unit determines an overlapping region of the plurality of position candidate regions, and determines a final detection position of the detection target object within the processed image based on the overlapping region and the plurality of position candidate regions.

12 Claims, 18 Drawing Sheets

(51) Int. Cl.
  *G06K 9/62* (2006.01)
  *H04N 5/28* (2006.01)
  *B60R 11/04* (2006.01)
  *G06T 7/73* (2017.01)

(52) U.S. Cl.
  CPC .............. *G06K 9/6255* (2013.01); *G06T 7/73* (2017.01); *H04N 5/28* (2013.01); *G06K 2209/21* (2013.01); *G06T 2207/30261* (2013.01)

(56) References Cited

U.S. PATENT DOCUMENTS

| | | | | |
|---|---|---|---|---|
| 2011/0074957 | A1* | 3/2011 | Kiyohara | G06K 9/342 348/148 |
| 2013/0010118 | A1* | 1/2013 | Miyoshi | B60R 1/00 348/148 |
| 2013/0222127 | A1* | 8/2013 | Ray Avalani | B60Q 9/008 340/436 |
| 2014/0354815 | A1* | 12/2014 | Hughes | G08G 1/163 348/148 |

OTHER PUBLICATIONS

Mao Ling, et al., "Preceding Vehicle Detection Using Histograms of Oriented Gradients" IEEE, XP031760644, 2010, pp. 354-358.

Xianbin Cao, et al., "Vehicle Detection and Motion Analysis in Low-Altitude Airborne Video Under Urban Environment" IEEE Transactions on Circuits and Systems for Video Technology, vol. 21, No. 10, XP011361148, Oct. 2011, pp. 1522-1533.

Birgi Tamersoy, et al., "Robust Vehicle Detection for Tracking in Highway Surveillance Videos using Unsupervised Learning" Advanced Video and Signal Based Surveillance, IEEE, XP031542397, 2009, pp. 529-534.

Zhou Junjing, et al., "Machine-Vision Based Preceding Vehicle Detection Algorithm: A Review" Proceedings of the 10th World Congress on Intelligent Control and Automation, IEEE, XP032270269, Jul. 2012, pp. 4617-4622.

\* cited by examiner

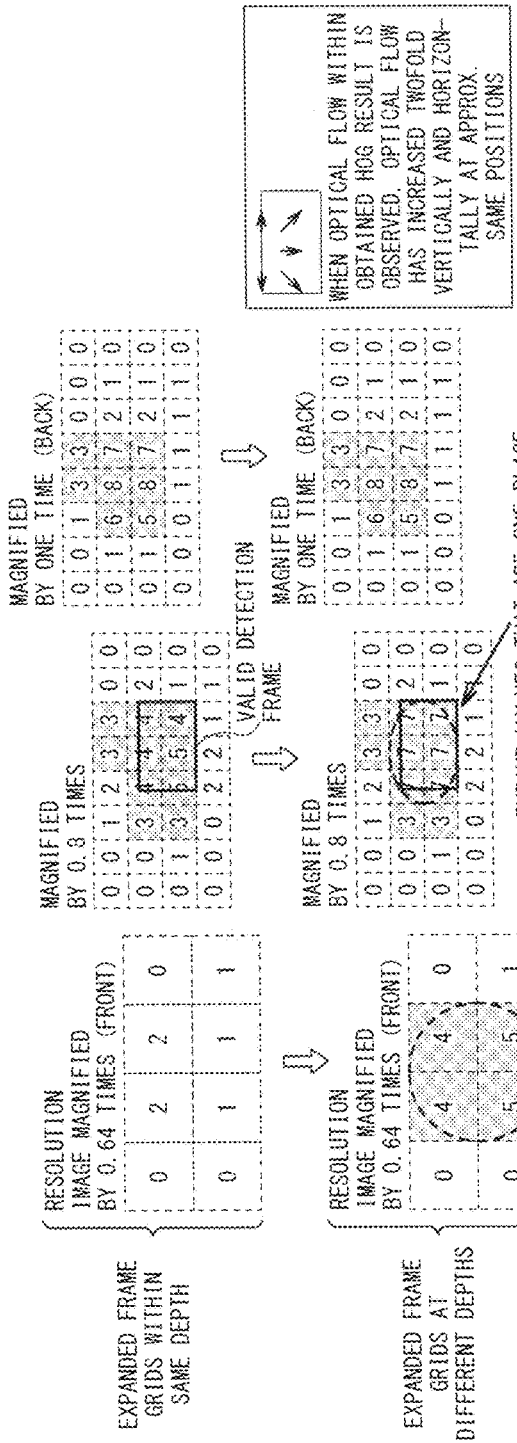

IMAGE PROCESSING APPARATUS AND IMAGE PROCESSING METHOD

CROSS-REFERENCE TO RELATED APPLICATIONS

This application claims the benefit of priority of Japanese Patent Application No. 2014-060738, filed Mar. 24, 2014, the entire contents of which are incorporated herein by reference.

FIELD

Embodiments described herein relate generally to an image processing apparatus and an image processing method.

BACKGROUND

Recently, onboard cameras for picking up images of a situation around a vehicle are being mounted in an increasing number of vehicles such as automobiles. The images picked up by the onboard camera are extremely useful because, by detecting an object in the image, the images can be utilized to determine the possibility of a collision between the vehicle and the object or to support steering of the vehicle when parking.

Image processing technology for detecting an object within an image (image based on the picked-up image and including processing target object; hereunder, referred to as "processed image") is being developed at a remarkable pace in recent years with a view to reducing the time required for detection while enhancing the detection accuracy. Pattern matching technology such as technology that uses, for example, HOG (histogram of oriented gradients) feature values may be mentioned as an example of such kind of technology for detecting objects.

When performing pattern matching, in some cases an object cannot be correctly detected from the processed image derived from the picked-up image, and an erroneous detection occurs. Technology for solving the problem of such erroneous detection includes, for example, technology that performs detection processing in multiple stages using a plurality of dictionaries, and utilizes only a result that was output as being detected in all of the detection processing stages as a correct detection result. According to this kind of technology, the occurrence of an erroneous detection can be reduced during pattern matching, and objects can be accurately detected from a processed image.

However, according to the above-described technology it is necessary to perform detection processing in multiple stages using a plurality of dictionaries. Consequently, in comparison to using a single dictionary, a large memory is required that has a size that corresponds to the number of dictionaries. Further, since it is necessary to perform detection processing in multiple stages, a longer time is required for the calculation operations in comparison to when using a single dictionary. Furthermore, even when using a plurality of dictionaries, in a case where the shape of an object changes in the processed images, such as when bilateral symmetry of an object is lost, a likelihood calculated by processing using the respective dictionaries becomes lower than a predetermined likelihood, and hence it becomes extremely difficult to detect the object.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 18A is an explanatory drawing illustrating an example of an optical flow; and FIG. 18B is an explanatory drawing illustrating an example of the manner in which a frame grid is expanded using the optical flow shown in FIG. 18A according to the second embodiment.

DETAILED DESCRIPTION

Hereinbelow, a description will be given of an image processing apparatus and an image processing method according to embodiments of the present invention with reference to the drawings.

In general, according to one embodiment, an image processing apparatus includes a processed image generation unit, a provisional detection unit, and a final detection unit. The processed image generation unit acquires an image around a vehicle picked up by a camera provided on the vehicle, and generates a processed image from the image for target object detection processing. The provisional detection unit scans a scanning frame of a predetermined size according to a detection target object on the processed image. The provisional detection unit detects a plurality of position candidate regions of the detection target object within the processed image by determining a feature value for respective scanning positions using a dictionary of the detection target object. The final detection unit determines an overlapping region of the plurality of position candidate regions. The final detection unit determines a final detection position of the detection target object within the processed image based on the overlapping region and the plurality of position candidate regions.

First Embodiment (Overall Configuration)

Figure 1:
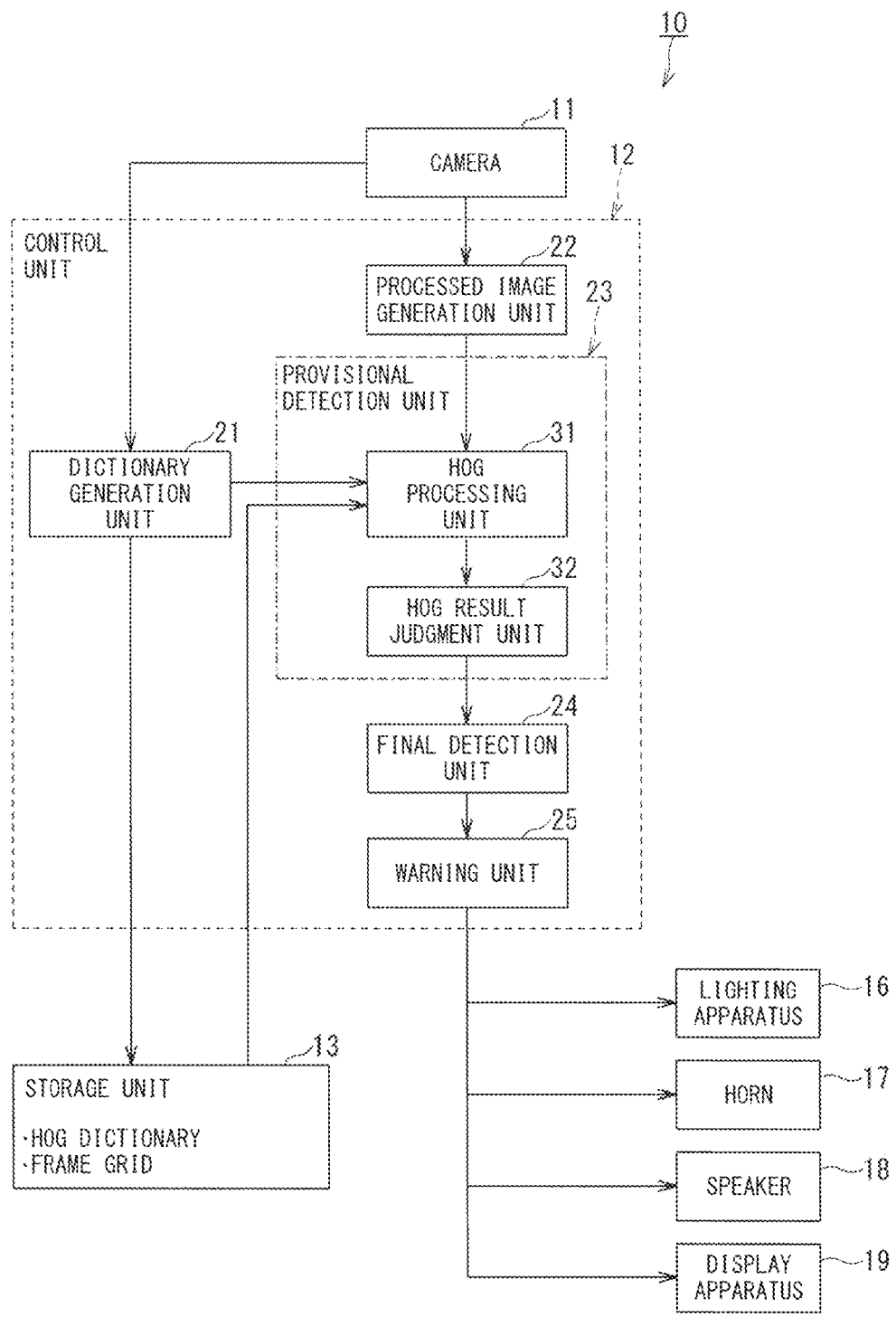
FIG. 1 is a block diagram illustrating an example of an image processing apparatus according to a first embodiment of the present invention.

FIG. 1 is a block diagram illustrating one configuration example of an image processing apparatus 10 according to a first embodiment of the present invention.

The image processing apparatus 10 includes a camera 11, a control unit 12, a storage unit 13, a lighting apparatus 16, a horn 17, a speaker 18 and a display apparatus 19.

The camera 11 comprises a CCD (charge coupled device) image sensor or a CMOS (complementary metal oxide semiconductor) image sensor, and captures video images of an area around a vehicle such as a private automobile, and generates image data and supplies the image data to the control unit 12.

For example, in the case of monitoring the rear of the vehicle, the camera 11 is provided in the vicinity of a license plate at a rear part of the vehicle or at an upper part of a rear window (rear camera). Further, in the case of monitoring the lateral direction of the vehicle, the camera 11 is provided in the vicinity of a side-view mirror (side camera). Furthermore, in the case of monitoring the front of the vehicle, the camera 11 is provided in the vicinity of a license plate at a front part of the vehicle or at an upper part of the front mirror (front camera).

A wide-angle lens or a fish-eye lens may be mounted on the camera 11 to enable image pickup with a wide viewing angle. For example, in a case where the camera 11 that is capable of image pickup with a wide viewing angle is arranged in the vicinity of a side-view mirror (side camera), it is possible to also simultaneously pick up an image in the front and rear directions of the vehicle in addition to picking up an image in the lateral direction of the vehicle. A configuration may also be adopted in which a plurality of the cameras 11 is used to capture images of a wide area outside the vehicle.

Hereinafter, an example is described of a case where a wide-angle lens or a fish-eye lens that enables image pickup with a wide viewing angle is mounted on the camera 11.

An image with a wide viewing angle that is picked-up by the camera 11 is converted (visual axis conversion) by the control unit 12 into a processed image having an arbitrary visual axis. In other words, based on an image with a wide viewing angle that is picked-up by the camera 11, the control unit 12 generates an image (processed image) that was perspectively projected onto a virtual plane of projection of the camera (hereunder, referred to simply as "plane of projection") that has an arbitrary visual axis in a normal-line direction. It is favorable to set the optical axis of the camera 11 so as to be parallel with the ground, or to be in a slightly downward direction from a line that is parallel with the ground.

The control unit 12 comprises, for example, a microcontroller that includes a CPU, a RAM and a ROM. The CPU of the control unit 12 loads an image processing program as well as data necessary for executing the program which are stored in storage media such as the ROM to the RAM. In accordance with the program, the CPU executes processing for accurately detecting an object while reducing the occurrence of an erroneous detection even in a case where the shape of the object changes in processed images.

The RAM of the control unit 12 provides a work area for temporarily storing the program executed by the CPU and the data. A storage medium such as the RAM or ROM of the control unit 12 stores image processing programs and various kinds of data necessary to execute the programs.

Note that the configurations of the storage media, as typified by the RAM or ROM, include recording media that can be read by the CPU, such as a magnetic or optical recording medium or a semiconductor memory, and a configuration may be adopted so as to enable a part or all of the program and data in the storage media to be downloaded through an electronic network, via a network connection unit that is not shown in the drawings.

In such case, the network connection unit implements various protocols for information communication that correspond to the form of the network, and connects the control unit 12 with electronic equipment such as an ECU of another vehicle via the electronic network in accordance with the various protocols. An electrical connection via the electronic network or the like can be applied with respect to the connection. Here, the term "electronic network" refers to information communication networks in general that utilize telecommunications technology and, in addition to a wireless/wired LAN (local area network) and the Internet network, includes a telephone communications network, an optical fiber communications network, a cable communications network, and a satellite communications network and the like.

The storage unit 13 is a nonvolatile memory to and from which the control unit 12 can write and read data. The storage unit 13 stores various information such as an image dictionary (model) that was previously generated using images obtained by picking up an image of a detection target object, and a frame grid that is generated by the control unit 12. These pieces of information may be updated via an electronic network or via a portable storage medium such as an optical disk.

The lighting apparatus 16 is constituted by a common headlight and is controlled by the control unit 12 to perform flashing (so-called "headlight flashing") to, for example, thereby issue a warning with respect to drivers or the like in the surrounding area outside of the own vehicle.

The horn 17 is controlled by the control unit 12, and outputs a warning sound with respect to the surrounding area outside of the own vehicle.

The speaker 18 is provided in the interior of the own vehicle, and is controlled by the control unit 12. The speaker 18 outputs beep sounds or sounds that correspond to various kinds of information, such as information informing of imminent danger, to the driver of the own vehicle.

The display apparatus 19 is provided at a position that can be visually recognized by the driver. A display output device such as a common display for vehicle use, a car navigation system, or a HUD (head up display) can be used as the display apparatus 19. In accordance with control performed by the control unit 12, the display apparatus 19 displays various kinds of information such as an image that is picked up by the camera 11 or an image showing a detection position of a detection target object.

(Overview of Configuration and Operations of Control Unit 12)

Next, an overview of the configuration and operations of the control unit 12 whose functions are implemented by the CPU will be described.

As shown in FIG. 1, depending on the image processing program, the CPU of the control unit 12 functions as at least a dictionary generation unit 21, a processed image generation unit 22, a provisional detection unit 23, a final detection unit 24 and a warning unit 25. The provisional detection unit 23 includes a HOG processing unit 31 and a HOG result judgment unit 32.

Each of the units 21 to 25 utilizes a required work area of the RAM as a place for temporarily storing data. Note that the units which implement these functions may be provided by hardware logic such as circuits without using the CPU.

Figure 2:
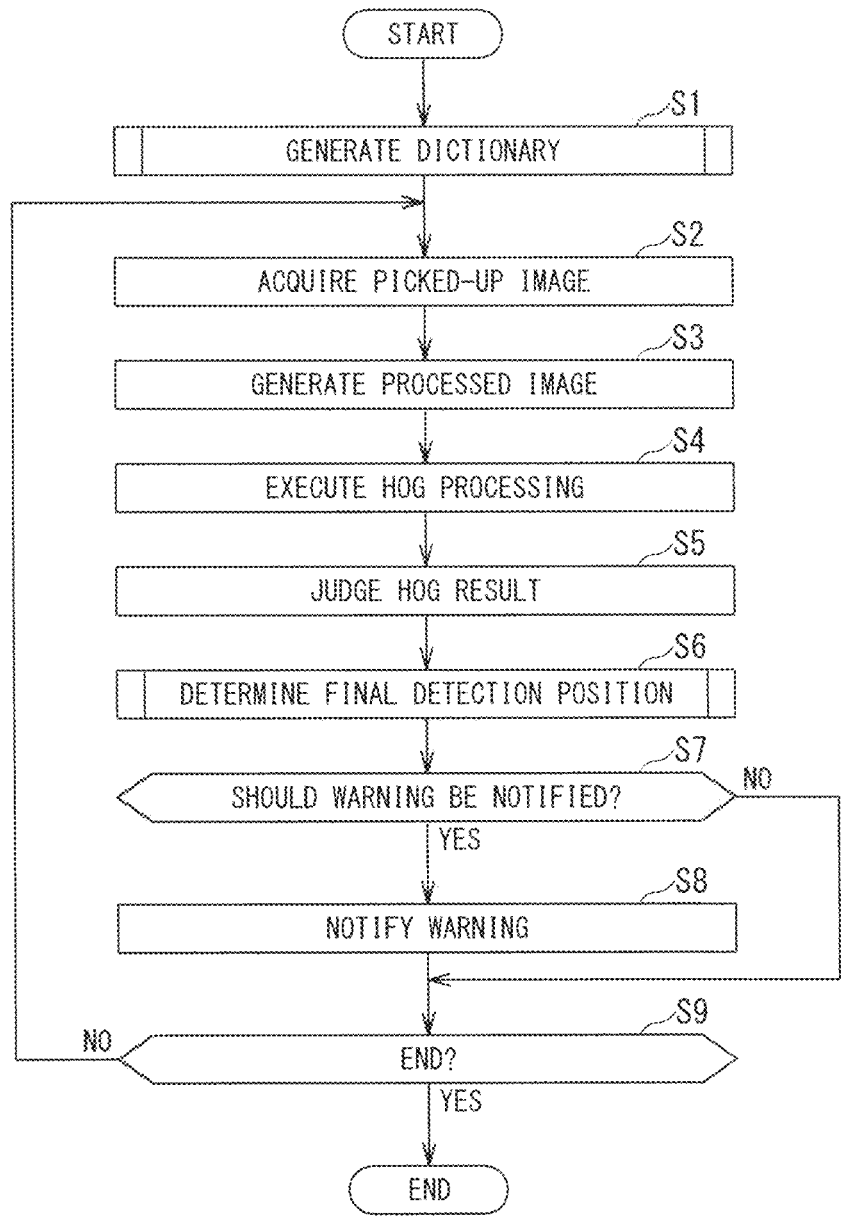
FIG. 2 is a flowchart showing procedures for accurately detecting an object while reducing the occurrence of an erroneous detection even in a case where the shape of an object changes in the processed images.

FIG. 2 is a flowchart showing procedures for accurately detecting an object while reducing the occurrence of an erroneous detection even in a case where the shape of an object changes in the processed images. These procedures are performed by the CPU of the control unit 12 shown in FIG. 1. In FIG. 2, a symbol including S and a numeral attached thereto denotes the respective steps in the flowchart.

In step S1, the dictionary generation unit 21 generates an image dictionary (model) using images that are previously obtained by picking up images of a detection target object, and stores the image dictionary in the storage unit 13. More specifically, the dictionary generation unit 21 generates the dictionary as a single dictionary in advance using a plurality of images of the detection target object picked up in advance by the camera 11. This plurality of images are obtained by arranging the detection target object at a corresponding plurality of positions in a predetermined range within an image-pickup range of the camera 11 such that the predetermined visual axis of the camera 11 is parallel with a normal line direction of a detection target surface of the detection target object, and are obtained by picking up each of the plurality of images by the camera 11 at the corresponding plurality of positions.

The dictionary that the dictionary generation unit 21 generates has contents that are applicable to various kinds of techniques for detecting an object from an image based on feature values. In the following description, an example is described of a case in which the dictionary that the dictionary generation unit 21 generates is a dictionary (hereunder, referred to as "HOG dictionary") that is suitable for target object detection processing based on HOG feature values (hereunder, referred to as "HOG processing"), and in which the provisional detection unit 23 performs HOG processing.

Next, in step S2, the processed image generation unit 22 acquires a picked-up image in which an image of the area surrounding the vehicle was picked up with a wide viewing angle from the camera 11.

Next, in step S3, based on the picked-up image acquired from the camera 11, the processed image generation unit 22 generates a processed image as an image that has been perspectively projected onto a plane of projection which adopts a visual axis as a normal-line direction, the visual axis being the same as the visual axis used to generate the dictionary.

Next, in step S4, the HOG processing unit 31 of the provisional detection unit 23 performs HOG processing (for example, refer to Japanese Patent Laid-Open No. 2010-44438 or Japanese Patent Laid-Open No. 2010-55195), and outputs a likelihood. More specifically, the HOG processing unit 31 converts the processed image into a gradient direction image, scans a frame of a predetermined size (scanning frame) that is in accordance with the detection target object, and determines a HOG feature value for each scanning position using the HOG dictionary. The HOG processing unit 31 thereby determines likelihoods that show the probability of the detection target object being present at the respective scanning positions. The HOG processing unit 31 can determine the likelihood (score) by applying to the dictionary an image within the scanning frame at the respective scanning positions. It can be said that the higher the likelihood is, the greater the degree to which the relevant image matches the dictionary.

A HOG feature value is a value in which the extent to which edges in a longitudinal, transverse, and oblique direction exist within a block is quantified. Consequently, it is known that it is difficult for HOG feature values to be affected by changes in brightness or the like, and that HOG feature values are robust with respect to changes in shape. Note that the HOG processing performed by the HOG processing unit 31 may be processing that utilizes a co-occurrence property (coHOG processing).

Next, in step S5, the HOG result judgment unit 32 of the provisional detection unit 23 takes a result in which a likelihood obtained by the HOG processing unit 31 is greater than a threshold value as a valid result. The position of a scanning frame corresponding to the valid result can be considered to be a position candidate region for a detection target object. In the present embodiment, the threshold value for the likelihood is set such that a plurality of valid results is obtained and the HOG result judgment unit 32 detects a plurality of position candidate regions. In the following description, a scanning frame detected by the HOG result judgment unit 32 is referred to as a "provisional detection frame".

The number of detections of provisional detection frames can be progressively increased in accordance with a decrease in a pixel staggering amount when the HOG processing unit 31 scans a scanning frame in the HOG processing, or with a decrease in the likelihood threshold value. Further, the number of detections of provisional detection frames can be progressively increased in accordance with an increase in the number of images used whose positions are shifted with respect to an image acquired at the time of dictionary generation, or with an increase in the number of images used for which a rate of enlargement was changed relative to an image acquired at the time of dictionary generation.

Next, in step S6, the final detection unit 24 determines an overlapping region between a plurality of position candidate regions. The final detection unit 24 then determines a final detection position of the detection target object in the processed image based on the overlapping region and the plurality of position candidate regions. In the following description, a determined frame corresponding to a final detection position that is determined by the final detection unit 24 is referred to as a "final detection frame".

Next, in step S7, the warning unit 25 determines whether or not information regarding the final detection position that was detected by the final detection unit 24 should be notified to the driver of the own vehicle. If the warning unit 25 determines that the final detection position should be notified, the CPU advances to step S8. In contrast, if the warning unit 25 determines that the final detection position need not be notified, the CPU advances to step S9. For example, the warning unit 25 can determine that the final detection position of the detection target object should be notified to the driver in a case where the final detection position is a position within a predetermined distance from the own vehicle. A configuration may also be adopted in which the present step S7 is not executed.

Next, in step S8, the warning unit 25 notifies the information regarding the final detection position to the driver of the own vehicle by performing at least one operation among an audio output operation through the speaker 18, a buzzer output operation through the speaker 18, and an operation to display a warning on the display apparatus 19 to the driver of the own vehicle, and thereafter the CPU advances to step S9. For example, the warning unit 25 superimposes the final detection position on the processed image, and displays the resulting image on the display apparatus 19. Further, the warning unit 25 may also issue a warning to the surrounding area outside the own vehicle by flashing the lighting apparatus 16 (so-called "headlight flashing") or by means of a warning sound of the horn 17.

Next, in step S9, the control unit 12 determines whether or not to end the present series of procedures. For example, the control unit 12 ends the series of procedures if the own vehicle has been stopped for a predetermined time period or more, or if an instruction was input by the driver. In the case of continuing the procedures, the CPU returns to step S2 to acquire a next frame image from the camera 11 and repeat the processing of steps S3 to S8.

By performing the above described procedures, even in a case where the shape of an object in a processed image changes, the object can be accurately detected while reducing the occurrence of an erroneous detection.

In a case where a detection target object matches a learned image in a dictionary, a result can be obtained in which the likelihood is remarkably high in the vicinity of the center of the plurality of provisional detection frames. However, in a case where the shape of a detection target object in a processed image is slightly distorted in comparison to a learned image in a dictionary, the likelihood in the vicinity of the center will not be sufficiently high, and a wide area will exist in which the likelihood is high to a certain extent.

When the shape of a detection target object in a processed image is distorted, the HOG result judgment unit 32 can detect a provisional detection frame of the distorted detection target object by lowering the likelihood threshold value. At such time, since the likelihood threshold value is low, in some cases the HOG result judgment unit 32 will erroneously detect an object other than the detection target object. Thus, utilizing the information regarding an overlapping region between the plurality of position candidate regions, the final detection unit 24 determines that there is a high probability that the detection target object is present in the region in which the plurality of position candidate regions (provisional detection frames) overlap, and thus determines the final detection frame.

Therefore, according to the image processing apparatus 10, even in a case where the likelihood with respect to a frame that matches a detection target object becomes low because there is a change in the shape (distortion) of the detection target object in the processed image, the detection target object can be reliably detected while reducing the occurrence of an erroneous detection.

(Generation of Dictionary)

A dictionary that is generated by the dictionary generation unit 21 according to the present embodiment will now be described.

Figure 3:
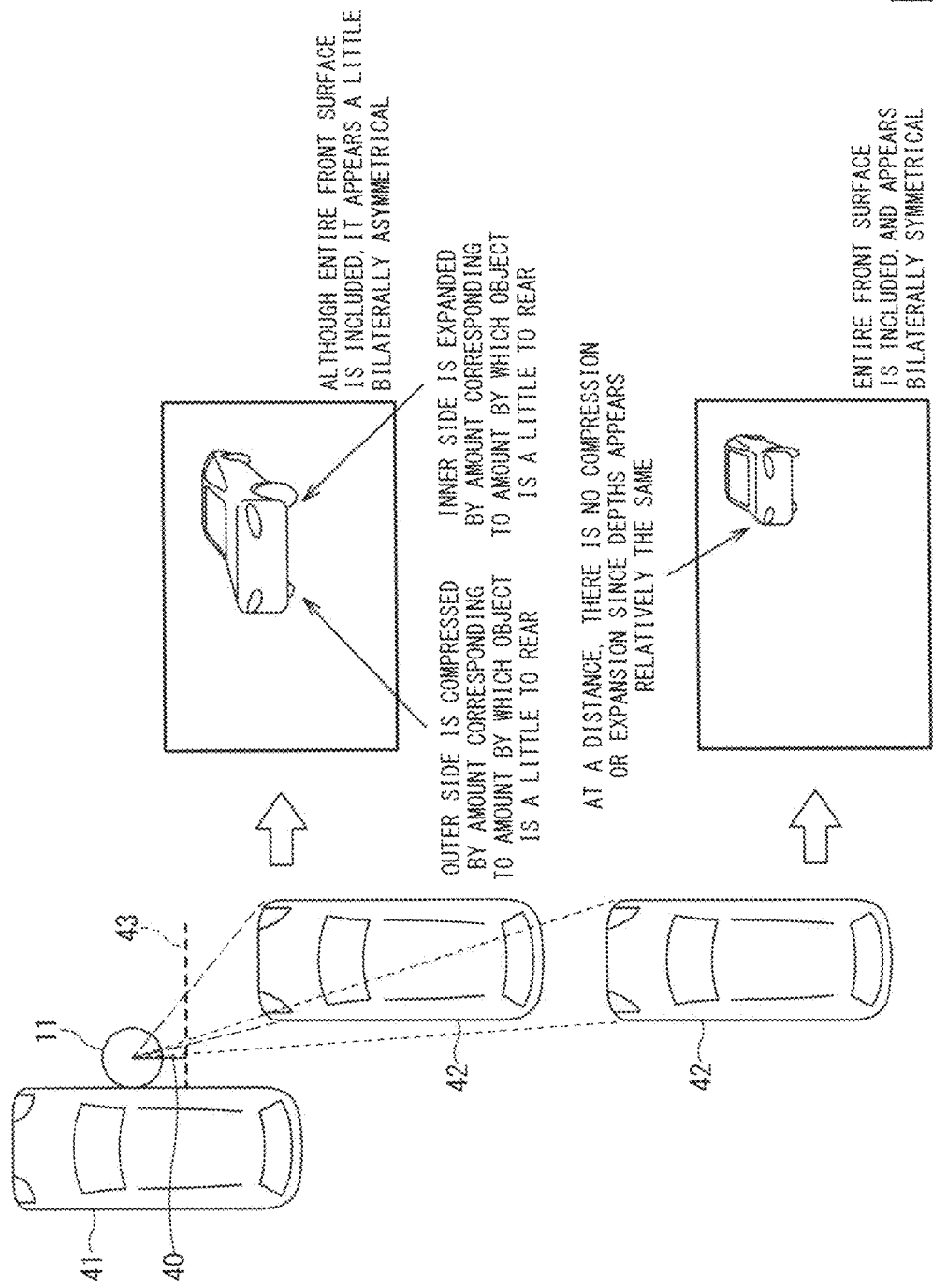
FIG. 3 is an explanatory drawing that illustrates an example of a processed image according to the present embodiment that is generated using the camera having a wide viewing angle when a visual axis faces directly backward in parallel with the travelling direction of an own vehicle.

FIG. 3 is an explanatory drawing that illustrates an example of a processed image according to the present embodiment that is generated using the camera 11 that has a wide viewing angle in a case where a visual axis 40 faces directly backward in parallel with the travelling direction of the own vehicle 41.

In the present embodiment, a processed image having the visual axis 40 that faces directly to the rear in parallel with the travelling direction of the own vehicle 41 is generated using the camera 11 that has a wide viewing angle (see FIG. 3). In this case, when a detection target object 42 is far away, the entire detection target surface of the detection target object 42 appears in the processed image, and the detection target surface appears bilaterally symmetrical. Meanwhile, when the detection target object 42 is close to the vehicle 41, the entire detection target surface appears in the processed image, and the detection target surface appears bilaterally asymmetrical to a small degree. This is because, in a case where the detection target surface is not completely flat, there is a difference in the appearance of the relative depth between the left and right sides of the detection target surface.

A conventional dictionary is generated without assuming that the shape of the detection target object 42 will change in processed images. Therefore, when using only one conventional dictionary, in the example illustrated in FIG. 3, the detection target object 42 cannot be detected from the processed image in a case where the detection target object 42 is close to the vehicle 41. Further, when using dictionaries that are in accordance with a plurality of shapes in order to correspond to changes in shape, a large storage medium of a size that corresponds to the number of dictionaries is required, and a large load is applied for the detection processing and the processing time also increases.

So as to enable detection of the detection target object 42 under the positional relationship between the visual axis 40 and the detection target surface normal-line direction as shown in FIG. 3, the dictionary generation unit 21 according to the present embodiment generates a single dictionary in advance using images obtained by arranging the detection target object 42 at a plurality of positions in a predetermined range within an image-pickup range of the camera 11 such that the predetermined visual axis 40 of the camera 11 and a normal-line direction of a detection target surface of the detection target object 42 become parallel, and then picking up images of the detection target object 42 in advance at each of a plurality of positions by means of the camera 11.

Figure 4:
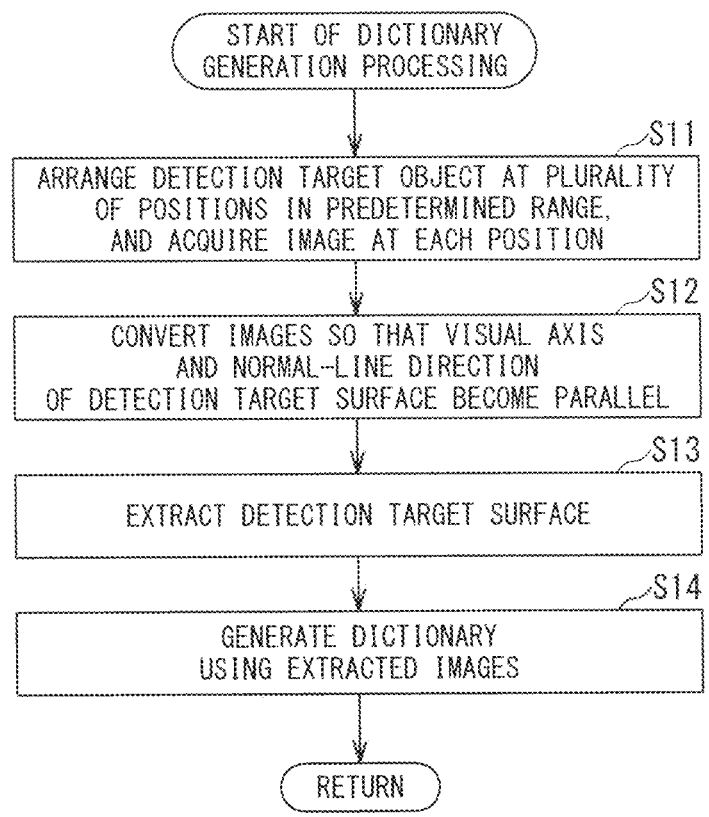
FIG. 4 is a subroutine flowchart illustrating an example of detailed procedures of dictionary generation processing executed by the dictionary generation unit in step S1 in FIG. 2.

FIG. 4 is a subroutine flowchart illustrating an example of detailed procedures of dictionary generation processing executed by the dictionary generation unit 21 in step S1 in FIG. 2. Note that dictionary generation may be performed at any time prior to executing the steps from step S2 onwards in FIG. 2. Therefore, picked-up images required for dictionary generation may be acquired using the camera 11 of the own vehicle 41 or may be acquired using another fixed camera or the like.

Figure 5:
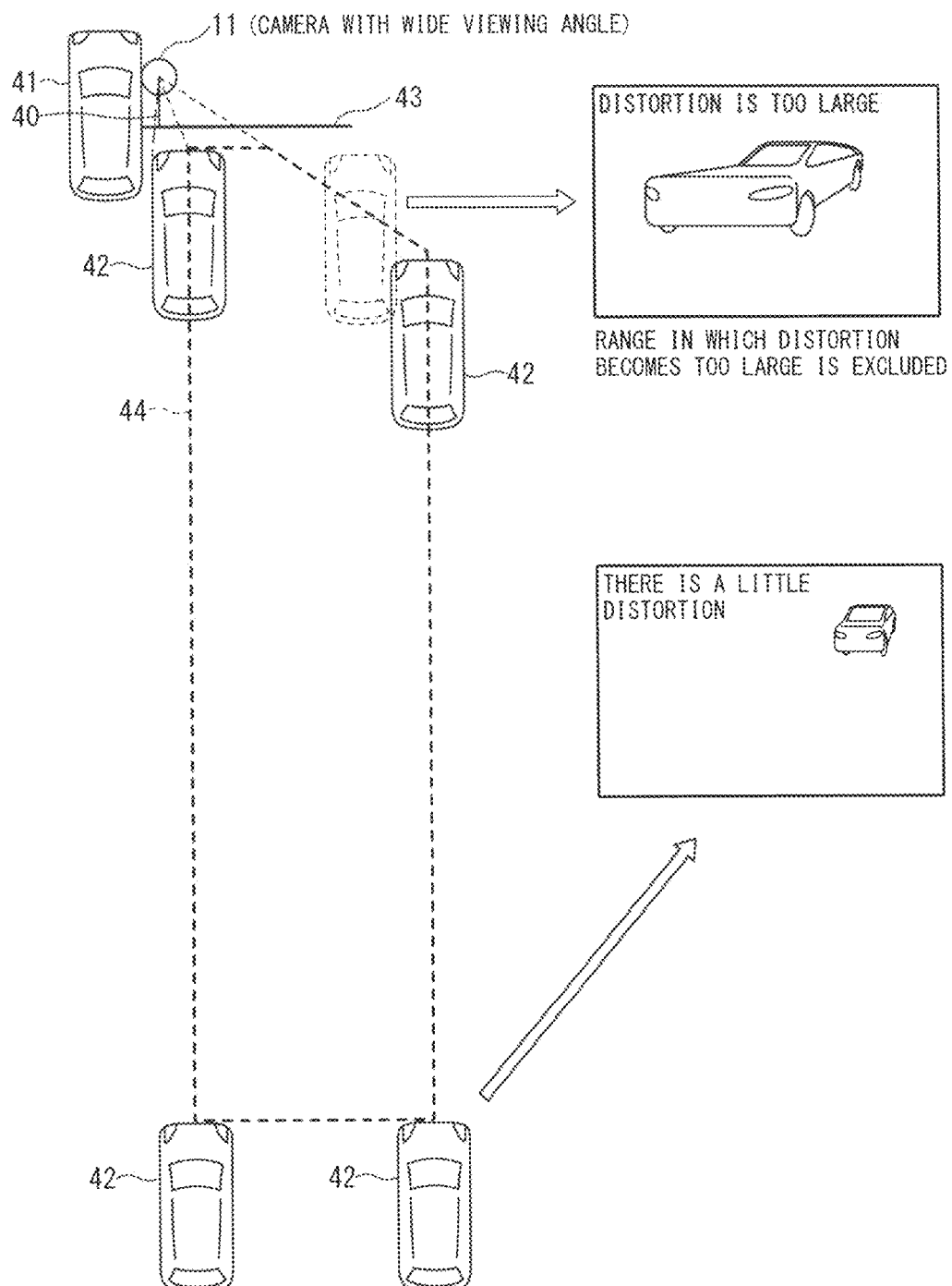
FIG. 5 is an explanatory drawing that illustrates an example of a predetermined range that is set when the dictionary generation unit generates a dictionary.

Further, FIG. 5 is an explanatory drawing that illustrates an example of a predetermined range 44 that is set when the dictionary generation unit 21 generates a dictionary.

In step S11, the dictionary generation unit 21 acquires images of the detection target object 42 at a plurality of positions in the predetermined range 44 that were picked up with the camera 11. At each position, the detection target object 42 is arranged such that the travelling direction of the own vehicle 41 matches the normal-line direction of the detection target surface.

It is favorable to adopt a surface that can be regarded as a flat surface to a certain extent as the detection target surface. For example, in a case where the detection target object 42 is an automobile, it is favorable to adopt the front surface, side surfaces and rear surface of the automobile as detection target surfaces. Further, in a case where the own vehicle 41 is a truck or a bus and the camera 11 can be mounted at a high position, the top surface of the automobile may also be adopted as a detection target surface. Naturally, a detection target surface is not limited to the surfaces of an automobile, and may be a side surface of a motorcycle or the like.

Next, in step S12, the dictionary generation unit 21 converts the picked-up images so as to have the visual axis 40 that is parallel with the normal-line direction of the detection target surface. Note that, the present step S12 need not be executed in a case where the camera 11 is installed so as to previously match the so-called optical axis of the camera 11 with the travelling direction of the own vehicle 41 and a lens distortion is corrected.

Next, in step S13, the dictionary generation unit 21 extracts the detection target surface from the images having the visual axis 40.

Subsequently, in step S14, the dictionary generation unit 21 generates a dictionary using the extracted images, and stores the dictionary in the storage unit 13.

The predetermined range 44 is a range that the provisional detection unit 23 takes as a detection target range. A shape at a position that deviates significantly from the center of a picked-up image changes significantly in comparison to the shape at the center. Consequently, it is favorable to make the predetermined range 44 a range in which such changes in shape are not too large. For example, the predetermined range 44 is set as a range from the visual axis 40 that is parallel with the travelling direction of the own vehicle 41 to an angle between around 30 degrees to 60 degrees (for example, to an angle of 45 degrees) towards the outer side of the own vehicle 41. Further, in a case where the detection target object 42 is a truck or a bus, a detection target surface can be regarding as being more parallel. Therefore, the predetermined range 44 may be widened to a range that extends from the visual axis 40 that is parallel to the travelling direction of the own vehicle 41 to an angle of around 85 degrees towards the outer side of the own vehicle 41.

Further, for example, in a case where the predetermined range 44 is set as a range that exceeds an angle of 45 degrees towards the outer side of the own vehicle 41 from the visual axis 40, a side surface of the detection target object 42 also becomes visible. Therefore, when adopting a range that exceeds 45 degrees, a side surface of the detection target object 42 may be taken as a detection target surface, and a dictionary may be separately generated for which the visual axis 40 is made parallel with the normal-line direction of the side surface (direction perpendicular to the travelling direction of the own vehicle 41). At such time, the detection target surface may be a small region such as a part of a side surface towards the front of the vehicle or a tire. By adopting a small region as a detection target surface to be extracted for a dictionary in a case where the visual axis 40 is parallel to the normal-line direction of a side surface, it is possible to reduce an influence caused by the decrease of the resolution with the increase in the distance from the camera 11 or an influence caused by the distortion of the side surface of the detection target object 42 (when the surface is not completely flat) with the increase in the distance from the camera 11.

In FIG. 5, an example is illustrated of a case where it is assumed that the image processing apparatus 10 detects another vehicle which is travelling in a traffic lane adjacent to the traffic lane in which the own vehicle 41 is travelling and is approaching the own vehicle 41. In this example, the predetermined range 44 is taken as the total of a range extending from the visual axis 40 to an angle of 45 degrees towards the outer side of the own vehicle 41 within a predetermined distance from the camera 11 and, from a position that is further than the predetermined distance from the camera 11, a range extending over a predetermined distance from the visual axis 40 towards the outer side of the own vehicle.

According to the procedures illustrated in FIG. 4, a single dictionary that corresponds to the predetermined range 44 can be generated that incorporates images of the detection target object 42 in which the bilateral symmetry has been lost to a certain extent.

A dictionary that the dictionary generation unit 21 generates is a dictionary in which images, the bilateral symmetry of which has been lost, are also learned on the assumption of a case arising in which a detection target surface is not a completely flat surface and the bilateral symmetry in the processed image is lost. Consequently, using only this single dictionary, the provisional detection unit 23 can detect the detection target object 42 which appears at a position that is separated from the center of the processed image and the shape of which is slightly distorted, although the likelihood with respect thereto is somewhat lowered. Accordingly, it is possible for the provisional detection unit 23 to detect the detection target object 42 at positions over a wide range (predetermined range 44) from the processed image with a single dictionary.

(Processed Image Generation)

Next, a processed image that is generated by the processed image generation unit 22 according to the present embodiment will be described.

Although FIG. 3 illustrates an example of detecting the detection target object 42 that is approaching from the rear of the own vehicle 41 by means of the camera 11 that is arranged in the vicinity of a side-view mirror, the image processing apparatus 10 according to the present embodiment may also include the camera 11 at a plurality of places, and may also detect the detection target object 42 that approaches from the side or the front.

Figure 6:
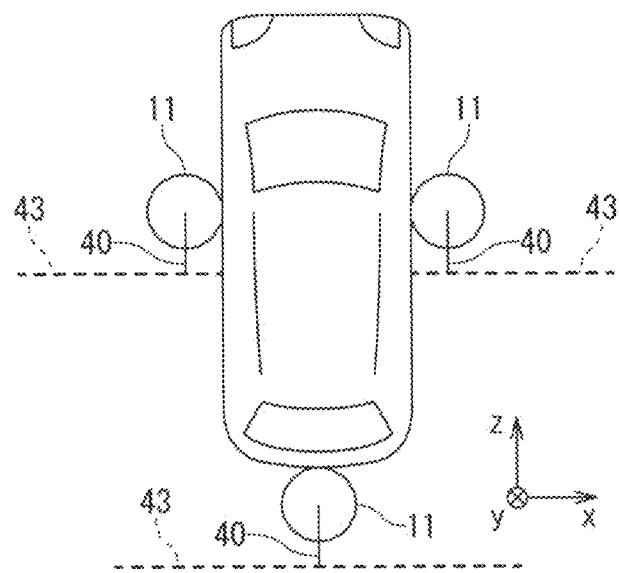
FIG. 6 is an explanatory drawing that illustrates an example in which the camera provided on the left and right sides and at a rear part of the vehicle, and shows the visual axis and a plane of projection of each camera in the case of detecting the front surface of another vehicle that runs alongside the own vehicle.
Figure 6:
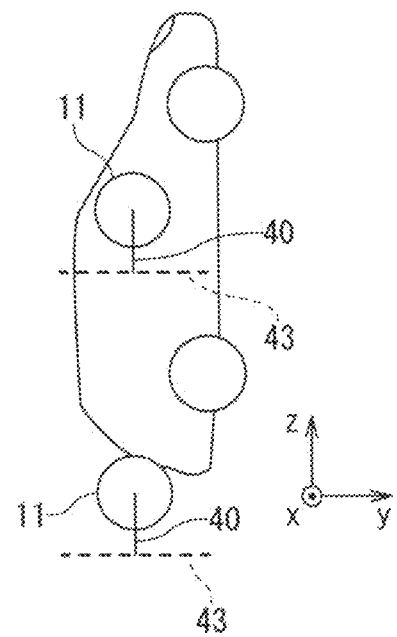
Figure 6:
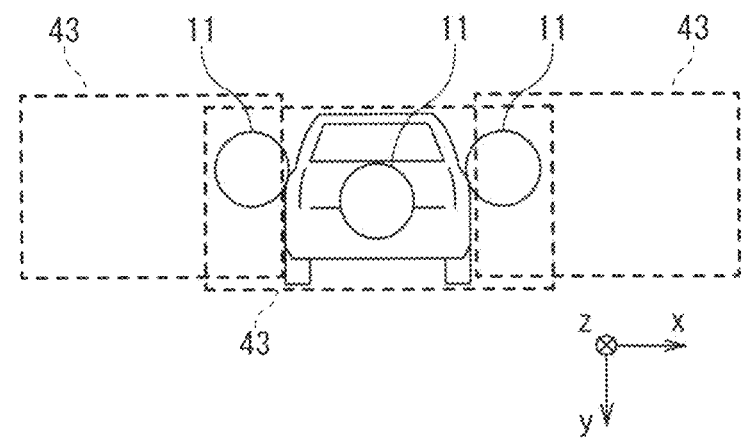

FIG. 6 is an explanatory drawing that illustrates an example in which the camera 11 provided on the left and right sides and at a rear part of the vehicle 41, and shows the visual axis 40 and a plane of projection 43 of each camera in the case of detecting the front surface of another vehicle that runs alongside the own vehicle 41. In the case of detecting the front surface of another vehicle that runs alongside the own vehicle 41, the processed image generation unit 22 generates a processed image that was perspectively projected onto the plane of projection 43 having the visual axis 40 towards the rear in parallel with the travelling direction of the own vehicle 41 based on an image picked up by the camera 11.

Further, the camera 11 may be provided on the left and right sides and at a front part of the vehicle 41, and the rear surface of another vehicle that runs alongside the own vehicle 41 may be detected. In the case of detecting the rear surface of another vehicle that runs alongside the own vehicle 41, the processed image generation unit 22 generates a processed image that was perspectively projected onto the plane of projection 43 having the visual axis 40 towards the front in parallel with the travelling direction of the own vehicle 41 based on an image picked up by the camera 11.

The camera 11 may also be provided on the left and right sides and at a front part and a rear part of the vehicle 41, and a side surface of another vehicle that runs alongside the own vehicle 41 may be detected. In the case of detecting the side surface of another vehicle that runs alongside the own vehicle 41, the processed image generation unit 22 generates a processed image that was perspectively projected onto the plane of projection 43 having the visual axis 40 that is perpendicular to the travelling direction of the own vehicle 41 based on an image picked up by the camera 11.

In the case of detecting a front surface, a side surface and a rear surface of another vehicle, the image processing apparatus 10 utilizes individual dictionaries that correspond to each visual axis 40. These dictionaries are generated in advance by the dictionary generation unit 21. Naturally, a dictionary that corresponds to all the detection target surfaces (front surface, rear surface and side surface of another vehicle) may be prepared in advance, and all the detection target surfaces may be taken as a detection object.

Figure 7:
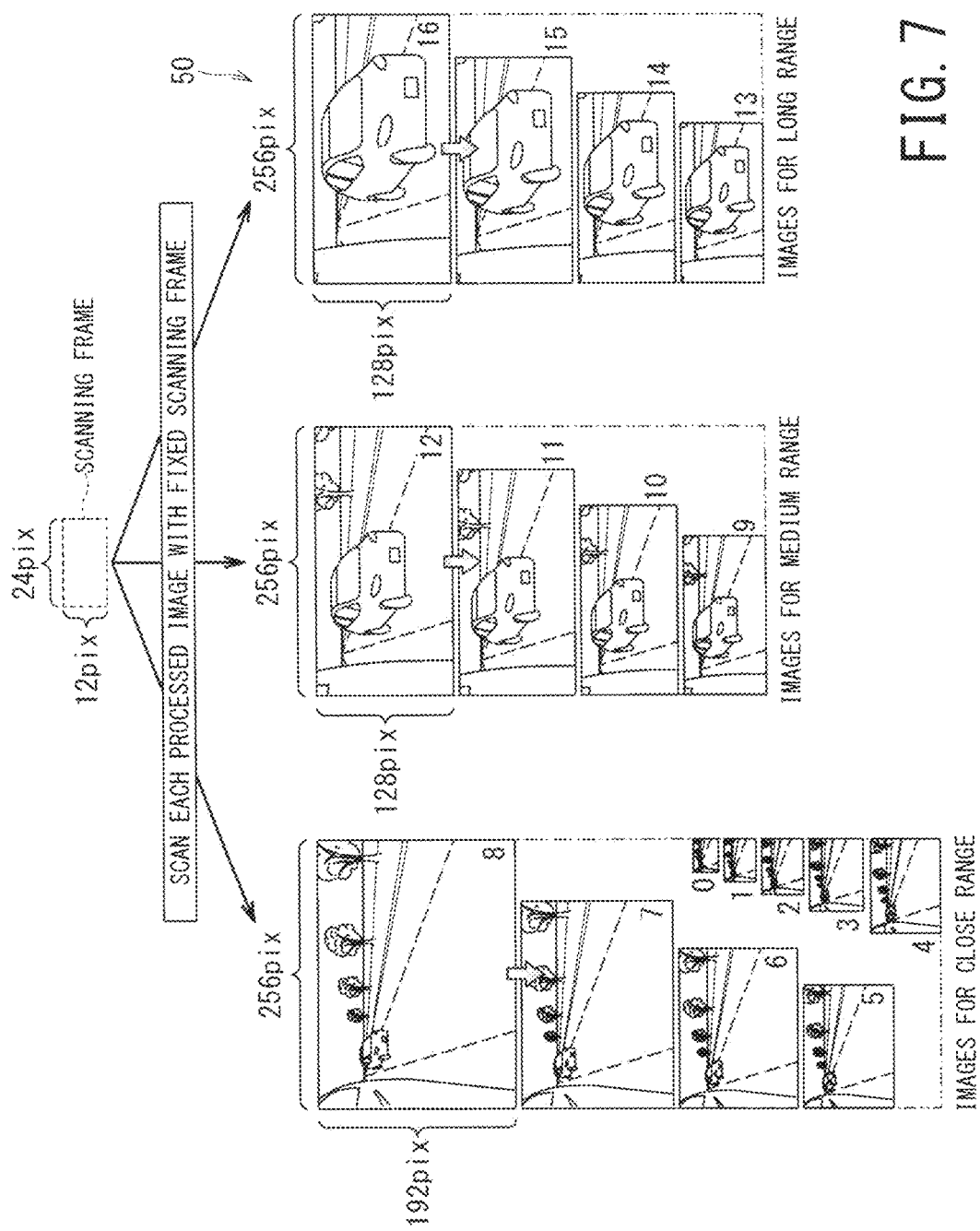
FIG. 7 is an explanatory drawing illustrating an example of image pyramid generated by the processed image generation unit.

FIG. 7 is an explanatory drawing illustrating an example of image pyramid 50 generated by the processed image generation unit 22. In FIG. 7, images are illustrated that are denoted by reference numerals 0 to 16 in order from the most reduced image (image with the lowest resolution).

Further, in FIG. 7, an example is illustrated in which a plurality of processed images are classified into images for close range, images for medium range, and images for long range, respectively, in accordance with the scaling factor (enlargement/reduction ratio). Further, in FIG. 7, an example is illustrated of a case where the images for close range (0-8) are magnified with respect to each other by a magnification rate of 1.3 times, the images for medium range (9-12) are magnified with respect to each other by a magnification rate of 1.19 times, and the images for long range (13-16) are magnified with respect to each other by a magnification rate of 1.19 times.

A dictionary generated by the dictionary generation unit 21 may be a dictionary that corresponds to images of a predetermined size (for example, a size of 24*12 pixels with respect to width*length or the like) in accordance with the detection target object 42. In this case, the provisional detection unit 23 scans a scanning frame of a predetermined size (for example, 24*12 pixels) on the processed image. Meanwhile, the size of the detection target object 42 on the processed image differs according to the distance of the detection target object 42 from the vehicle 41 of the provisional detection unit 23. For example, in a case where the detection target object 42 is far from the vehicle 41, the detection target object 42 appears in a small size on the processed image in comparison to when the detection target object 42 is close to the vehicle 41.

Therefore, in a case where the provisional detection unit 23 scans a scanning frame of a certain size on the processed image, it is favorable for the processed image generation unit 22 to generate an image group (image pyramid) 50 that includes a plurality of processed images for which distances with respect to the plane of projection 43 that are set from the own vehicle 41 are mutually different. At such time, the processed image generation unit 22 generates each processed image such that the respective processed images have the visual axis 40 that is parallel to the normal-line direction of the detection target surface, that is, have the visual axis 40 that is identical to the visual axis 40 used for dictionary generation.

It can be measured in advance a distance to the detection target object 42 from the own vehicle 41 in a case where the size of the detection target object 42 on the processed image matches the size of the scanning frame. Therefore, each processed image can be associated in advance with a distance to the detection target object 42 from the own vehicle 41. The smaller that a processed image is, the shorter the distance from the own vehicle 41 that is associated therewith will be.

In this case, since a surface in the processed image is a flat surface, the distances for the respective processed images are distances in the visual axis direction. A cylindrical or spherical surface may also be adopted as a surface of a processed image. For example, in a case where a cylindrical surface is adopted, the focal distance will be in a circular (two-dimensional) direction, and the distance to the detection target object 42 will be in a circular (two-dimensional) direction. Further, for example, in a case where a spherical surface is adopted, the focal distance will be in a spherical (three-dimensional) direction, and the distance to the detection target object 42 will be in a spherical (three-dimensional) direction.

Note that, it is sufficient that the respective processed images are associated with mutually different distances from the own vehicle 41, and the processed images may be generated by scaling (enlarging or reducing) images picked up by the camera 11 using a plurality of scaling factors, or may be generated at intervals of a certain distance (for example, two meters) from the own vehicle 41 to the detection target object 42.

When generating the image pyramid 50, the processed image generation unit 22 sets the plane of projection 43 for each predetermined distance from the own vehicle 41, and generates the respective processed images using the respective planes of projection 43 based on the picked-up image.

In a case where the respective planes of projection 43 have the same visual axis 40, the provisional detection unit 23 can apply a single dictionary with respect to all of the processed images constituting the image pyramid 50. When the image pyramid 50 is generated, the provisional detection unit 23 scans a scanning frame (a frame of a predetermined size) on each processed image, and performs detection processing to detect provisional detection frames (position candidate regions) of the detection target object 42 based on HOG feature values using the HOG dictionary.

(Scanning Frame)

Figure 8:
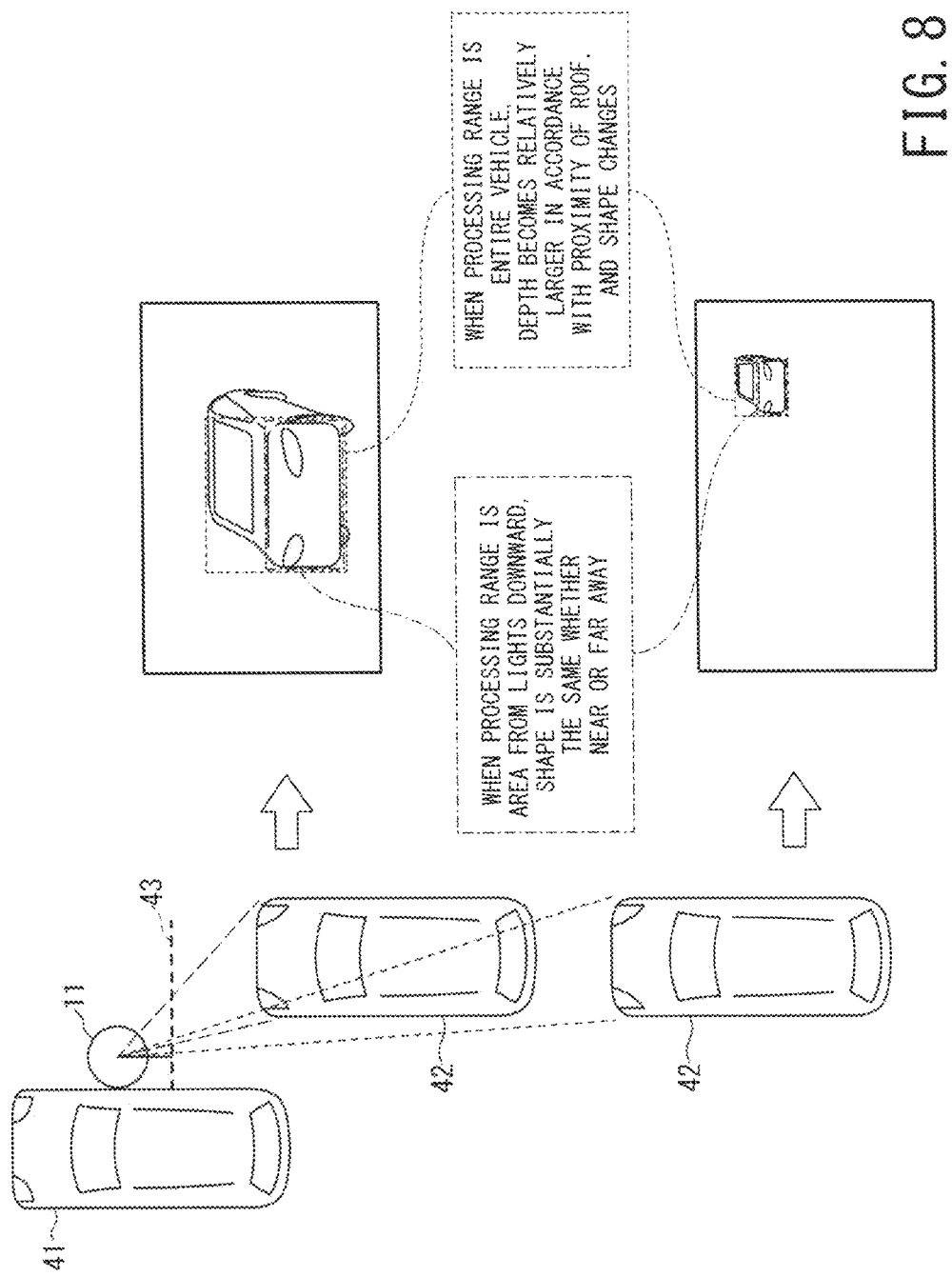
FIG. 8 is an explanatory diagram illustrating a region (detection target surface) that serves as an object of HOG processing by the HOG processing unit.

FIG. 8 is an explanatory diagram illustrating a region (detection target surface) that serves as an object of HOG processing by the HOG processing unit 31.

The HOG processing unit 31 scans a scanning frame of a size that is in accordance with the detection target surface (HOG processing region) of the detection target object 42 on the processed image, and determines likelihoods for the respective scanning positions by determining HOG feature values using the HOG dictionary. It is preferable that the detection target surface is a region that can be regarded as a flat surface to a certain extent, even if the detection target surface is not a completely flat surface. Therefore, in a case where the detection target object 42 is an automobile and the visual axis 40 is parallel to the travelling direction of the own vehicle 41, it is favorable if the provisional detection unit 23 takes an area around lights on the front surface of the automobile (other vehicle) as the detection target surface. This is because, since a front glass portion is positioned to the rear relative to the lights when viewed from the own vehicle 41, a processed image will be created in which the lateral positions of the front glass portion and the area around the lights are shifted in a case where the automobile (other vehicle) is at a position that is close to and is at the side of the own vehicle 41.

Note that, in a case where the image processing apparatus 10 takes only positions that are at a distance from the own vehicle 41 as the predetermined range 44, since the depths with respect to the front glass portion and the area around the lights become approximately the same relatively, the entire automobile including the front glass may be taken as the detection target surface.

Further, in a case where the visual axis 40 is perpendicular to the travelling direction of the own vehicle 41, it is favorable to take a side surface of the other vehicle as the detection target surface. The detection target surface may be a small region such as a part of a side surface towards the front of the vehicle or a tire. By adopting a small region as the detection target surface, it is possible to reduce an influence caused by the decrease of the resolution with the increase in the distance from the camera 11 or an influence caused by the distortion of the side surface of the detection target object 42 (in a case where the surface is not completely flat) with the increase in the distance from the camera 11.

The above-described single dictionary also corresponds to a case where the detection target object 42, that is included in an image picked up by the camera 11 that has a wide viewing angle, appears at position that is separated from the center of the image and the shape thereof is consequently distorted in comparison with the detection target object 42 which appears at the center of the image. Therefore, even if the shape of the detection target object 42 is distorted in an image of a wide range picked up by the camera 11 having a wide viewing angle, the provisional detection unit 23 can detect the detection target object 42 flexibly and stably while suppressing the occurrence of an erroneous detection using a single dictionary.

Further, the image processing apparatus 10 can detect the detection target object 42 at a wide range of positions using a single dictionary. Therefore, in comparison to using a plurality of dictionaries, the required storage capacity can be significantly decreased, and a load applied in the detection processing and the processing time can be reduced. Further, in a case where the other vehicle is in close proximity to the own vehicle 41, the image processing apparatus 10 can make the visual axis 40 a direction that is perpendicular to the travelling direction of the own vehicle 41, make the predetermined range 44 a wide range along the travelling direction of the own vehicle 41, and set the detection target surface as the side surface or a detection object of the other vehicle. Therefore, in particular in a case where the camera 11 is provided in the vicinity of a side-view mirror, another vehicle that overtakes the own vehicle 41 can be monitored up to a position that is close to the own vehicle 41.

In cases where there is a change in the shape (distortion) of the detection target object 42 within a processed image, including a case where a wide range is covered with a single dictionary in this manner, the likelihood will become lower in a scanning frame that matches the detection target object 42. At such time, if the likelihood threshold value is merely lowered, not only will the distorted detection target object 42 be detected, but unintended objects will also be erroneously detected.

The HOG result judgment unit 32 of the image processing apparatus 10 according to the present embodiment therefore detects a plurality of position candidate regions (provisional detection frames) as normalized frames on a certain single processed image while also lowering the likelihood threshold value. The final detection unit 24 then determines a final detection position of the detection target object 42 in the processed image based on an overlapping region of the plurality of position candidate regions, and thereby reduces the occurrence of an erroneous detection.

(Processing for Detecting Final Detection Position)

In step S6 in FIG. 2, the final detection unit 24 determines an overlapping region among a plurality of provisional detection frames (position candidate regions), and determines a final detection frame based on the overlapping region and the plurality of provisional detection frames.

At this time, the final detection unit 24 may use a history of overlapping regions in a plurality of frame images in the past and the current frame image. For example, the final detection unit 24 may extract a plurality of valid position candidate regions (hereunder, referred to as "valid detection frames") from a plurality of provisional detection frames of the current frame image based on a history of overlapping regions and may adopt a valid detection frame having the highest likelihood among the plurality of valid detection frames as the final detection frame. The final detection unit 24 may also determine the final detection frame by subjecting the plurality of valid detection frames to weighted-addition averaging using the respective likelihoods thereof.

By using a history of overlapping regions, determination of the final detection frame can be limited to positions at which the probability that the detection target object 42 is present is high, and the occurrence of an erroneous detection can be reduced.

In addition, the final detection unit 24 may correct an overlapping region using an optical flow between the immediately preceding frame image and the current frame image, and may determine the final detection frame using the corrected overlapping region. By using an optical flow, the final detection unit 24 can stably determine the final detection frame even in a case where the relative speed between the own vehicle 41 and the detection target object 42 is high.

Figure 9:
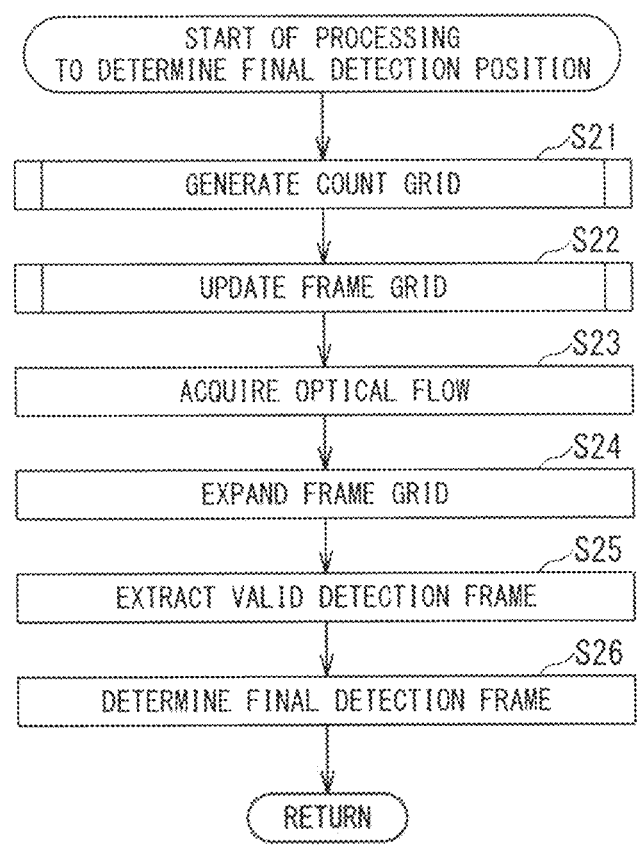
FIG. 9 is a subroutine flowchart illustrating an outline of procedures of processing to determine a final detection position that is executed by the final detection unit in step S6 in FIG. 2.

FIG. 9 is a subroutine flowchart illustrating an outline of procedures of processing to determine a final detection position that is executed by the final detection unit 24 in step S6 in FIG. 2.

These procedures start when a plurality of provisional detection frames (position candidate regions) having a likelihood equal to or greater than a predetermined likelihood threshold value are obtained by the HOG result judgment unit 32 in step S5 in FIG. 2. The provisional detection frames, for example, have a rectangular shape.

Note that, in a case where the image pyramid 50 was generated, the HOG result judgment unit 32 detects a plurality of provisional detection frames from each of a plurality of processed images having different enlargement/ reduction ratios. In this case, prior to executing step S11, the final detection unit 24 takes one processed image (for example, an image with the highest resolution (with the finest pixels)) as a grid image, and normalizes the size and position of each detection frame to the grid image.

(Processing for Detecting Final Detection Position: Count Grid Generation Processing)

In step S21, the final detection unit 24 generates a count grid for the current frame image. A count grid is obtained by dividing the grid image into grids (cells) of a predetermined size. A value (count) in accordance with the position of the relevant provisional detection frame for each normalized provisional detection frame is then assigned, whereby the final detection unit 24 generates the count grid for the current frame.

Figure 10:
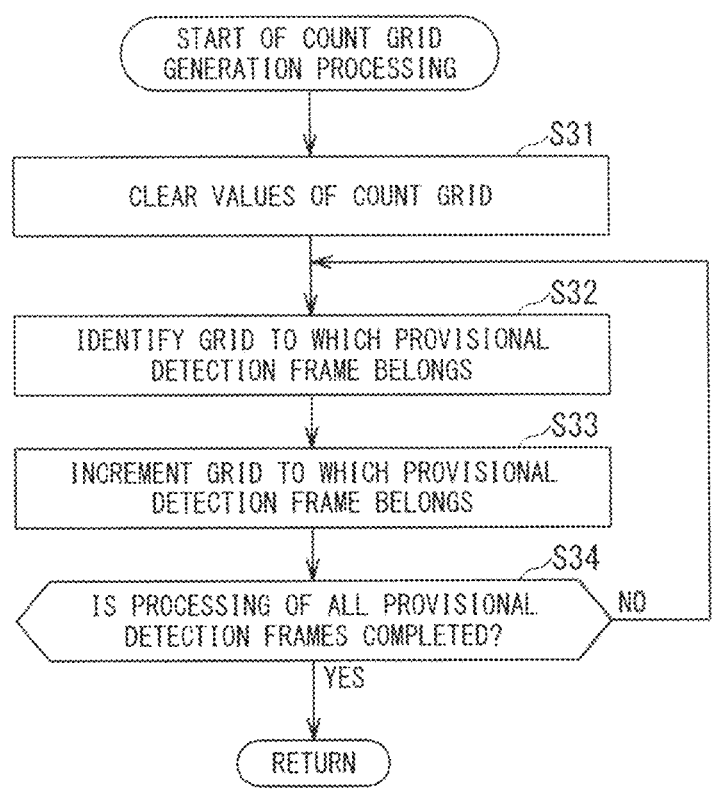
FIG. 10 is a subroutine flowchart illustrating an example of detailed procedures of the count grid generation processing executed by the final detection unit in step S21 in FIG. 9.
Figure 11:
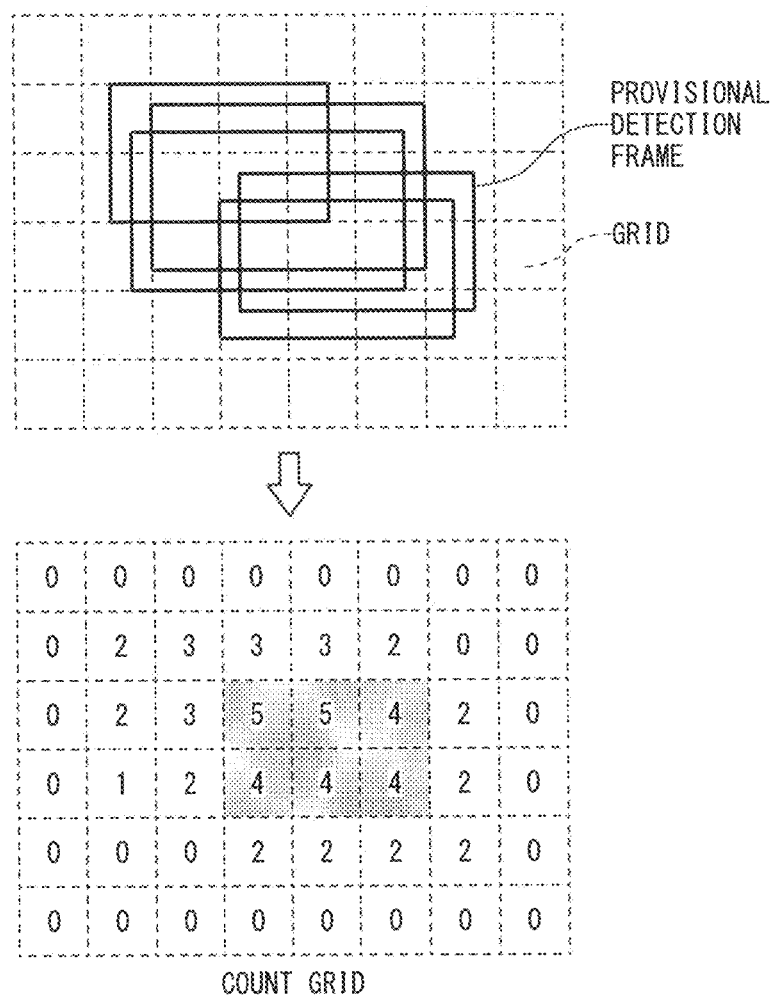
FIG. 11 is an explanatory drawing illustrating an example of the manner in which a count grid is generated.

FIG. 10 is a subroutine flowchart illustrating an example of detailed procedures of the count grid generation processing executed by the final detection unit 24 in step S21 in FIG. 9. FIG. 11 is an explanatory drawing illustrating an example of the manner in which a count grid is generated.

In step S31, the final detection unit 24 initializes a count grid obtained by dividing a grid image into grids (cells) of a predetermined size.

Next, in step S32, for each normalized provisional detection frame, the final detection unit 24 identifies a grid to which the provisional detection frame belongs.

Next, in step S33, the final detection unit 24 increments values of the grids to which the provisional detection frames belong. At this time, a configuration may be adopted such that, the higher that the likelihood of the provisional detection frame is, the greater the amount by which the value of the grid to which the provisional detection frame belongs is incremented. In FIG. 11, an example is illustrated of a case in which the relevant grid is considered to be a grid to which the provisional detection frame belongs when even one portion of an inner region of the provisional detection frame (position candidate region) belongs to a grid.

Thereafter, if a provisional detection frame exists for which the processing in steps S32 and S33 has not been performed (No in step S34), the final detection unit 24 returns to step S32, while if the processing in steps S32 and S33 is completed for all of the provisional detection frames (Yes in step S34), the final detection unit 24 ends the processing to generate a count grid and advances to step S22 in FIG. 9.

As a result, the distribution of values of the grids in the count grid becomes a distribution that corresponds with overlapping regions of the plurality of provisional detection frames (position candidate regions).

(Processing for Detecting Final Detection Position: Frame Grid Update Processing)

Next, in step S22, with respect to a frame grid obtained by dividing the grid image into grids (cells) of the same size as in the count grid, the final detection unit 24 updates values of the respective grids of a frame grid obtained for the previous frame image, by adding or subtracting in accordance with the values of the respective grids of the count grid, and thereby obtains a frame grid for the current frame image.

Figure 12:
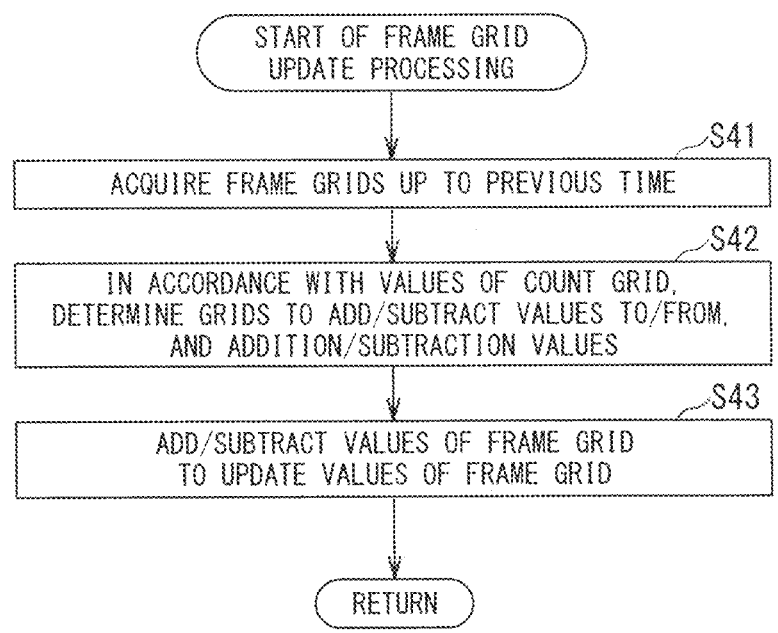
FIG. 12 is a subroutine flowchart illustrating an example of detailed procedures of the frame grid update processing executed by the final detection unit in step S22 of FIG. 9.
Figure 13:
FIG. 13 is an explanatory drawing illustrating the manner in which the frame grid is updated.

FIG. 12 is a subroutine flowchart illustrating an example of detailed procedures of the frame grid update processing executed by the final detection unit 24 in step S22 of FIG. 9. FIG. 13 is an explanatory drawing illustrating the manner in which the frame grid is updated.

In step S41, the final detection unit 24 acquires a frame grid that is obtained by dividing the grid image into grids (cells) of the same size as in the count grid from a storage medium such as the RAM or the storage unit 13. The frame grid stored in the storage medium is a frame grid (past frame grid) that was generated by the final detection unit 24 in processing for detecting the final detection position in the previous frame image.

Next, in step S42, in accordance with the values of the respective grids of the count grid, the final detection unit 24 determines an addition/subtraction value for each of the corresponding grids of the frame grid. At this time, an upper limit (for example, 9) and a lower limit (for example, 0) may be set for the values of the frame grid. Further, an addition value (subtraction value) may be progressively increased as the value in the count grid increases (decreases). For example, a configuration may be adopted such that the corresponding frame grid value is decreased by 3 when a value in the count grid is 0 or 1, the corresponding frame grid value is decreased by 1 when the count grid value is 2, the corresponding frame grid value is not changed when the count grid value is 3, the corresponding frame grid value is increased by 1 when the count grid value is 4 or 5, and the corresponding frame grid value is increased by 2 when the count grid value is 6 or more. In FIG. 13, an example is illustrated of a case where the upper and lower limits of the values in the frame grid are 9 and 0, respectively, and 1 is added to the value of a grid of the frame grid corresponding to a grid having a value of 4 or more in the count grid, while 2 is subtracted from the value of a grid of the frame grid corresponding to a grid having a value of 3 or less in the count grid.

Next, in step S43, the final detection unit 24 updates the values of the respective grids of the frame grid (past frame grid) obtained for the previous frame image by adding or subtracting using the addition/subtraction values determined in step S42 to thereby obtain a frame grid for the current frame image, and stores the obtained frame grid in a storage medium. Thereafter, the final detection unit 24 proceeds to step S23 in FIG. 9.

As a result, the frame grid reflects the history of overlapping regions in a plurality of past frame images and the current frame image.

(Processing for Detecting Final Detection Position: Frame Grid Expansion Processing)

Next, in step S23, the final detection unit 24 acquires an optical flow between the previous (immediately preceding) frame image and the current frame image. An optical flow can be determined using, for example, a block matching method or a gradient method.

Next, in step S24, the final detection unit 24 expands the frame grid (corrects a value of each grid) using the optical flow.

Figure 14:
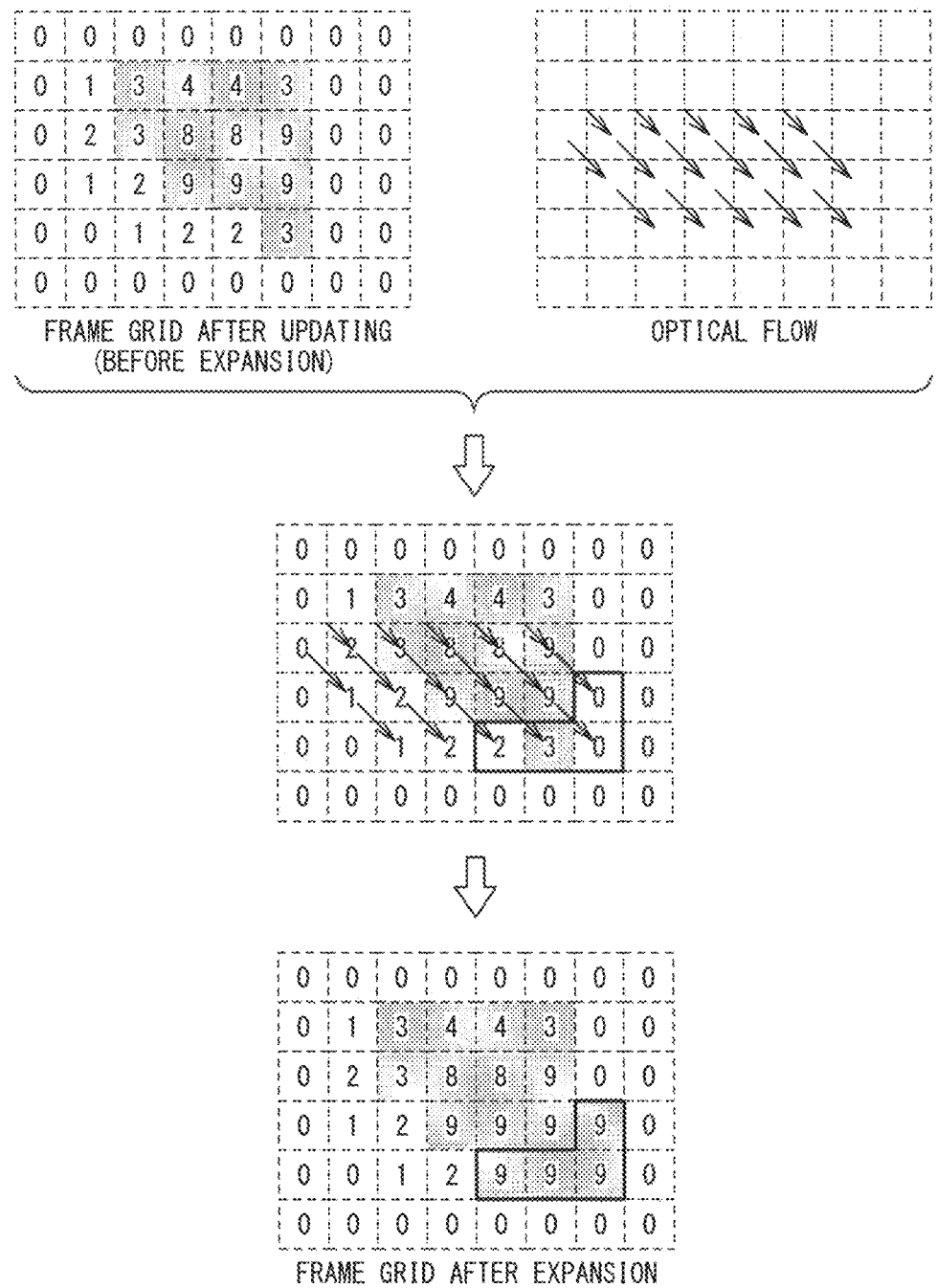
FIG. 14 is an explanatory drawing illustrating an example of the manner in which the frame grid is expanded using an optical flow in the first embodiment.

FIG. 14 is an explanatory drawing illustrating an example of the manner in which the frame grid is expanded using an optical flow in the first embodiment. Optical flow information can be used to associate the previous grid and relevant current grid with respect to its position with each other. Therefore, for each grid of the updated frame grid obtained in step S23, in a case where a past value of a grid associated with the relevant current grid by the optical flow is greater than a current value of the relevant current grid, the current value may be replaced with the past value of the grid (see FIG. 14). In a case where a past value of a grid associated with the relevant current grid by the optical flow is 0, the current value of the relevant current grid may be reduced (for example, 2 may be subtracted from the current value).

Further, the current value of a grid may be simply replaced with a past value of a grid associated therewith by the optical flow.

By expanding the frame grid using an optical flow, even in the case of detecting a detection target object 42 which is moving quickly, the motion thereof can be tracked and reliably detected.

A configuration may also be adopted in which steps S23 and S24 are not executed. Further, with respect to a position corresponding to a grid with a high value among the grids of the frame grid obtained in step S22 (or in step S24 if steps S23 and S24 are executed), a likelihood threshold value thereof may be lowered by the HOG result judgment unit 32 from the next frame image. That is, the HOG result judgment unit 32 may change the likelihood for each scanning position of the scanning frame in accordance with the values of the respective grids of the frame grid. Detection omissions can be prevented by lowering the likelihood threshold value. (Processing for detecting final detection position: valid detection frame extraction and final detection frame determination)

In step S25, the final detection unit 24 sets grids of the frame grid as valid grids for which the values are equal to or greater than a predetermined value. The final detection unit 24 extracts provisional detection frames that overlap with the valid grids from among the provisional detection frames (see FIG. 11) as valid detection frames.

Figure 15A:
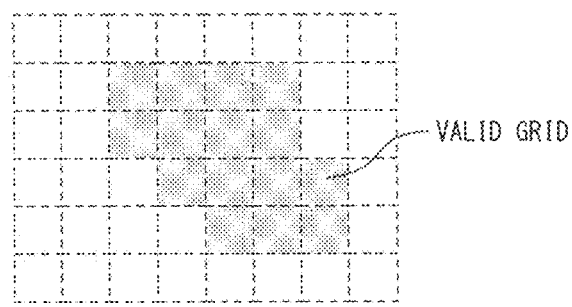
FIG. 15A is an explanatory drawing showing an example of valid grids that are set in the frame grid.
Figure 15B:
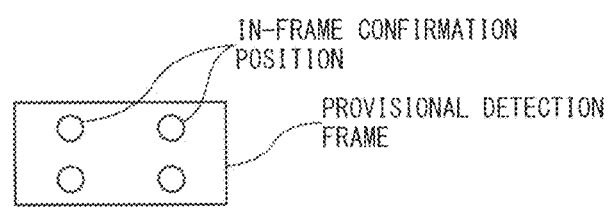
FIG. 15B is an explanatory diagram illustrating a condition for extracting a valid detection frame.
Figure 15C:
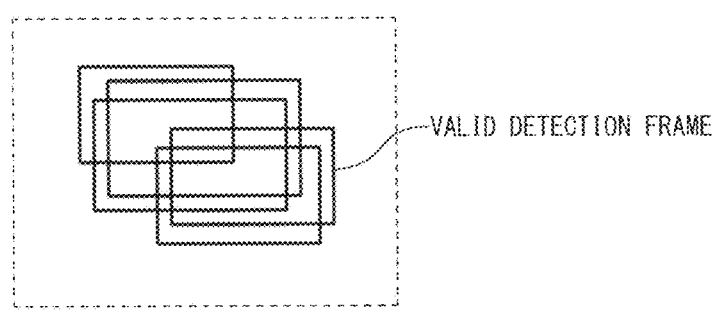
FIG. 15C is an explanatory drawing showing an example of a plurality of valid detection frames that were extracted.
Figure 15D:
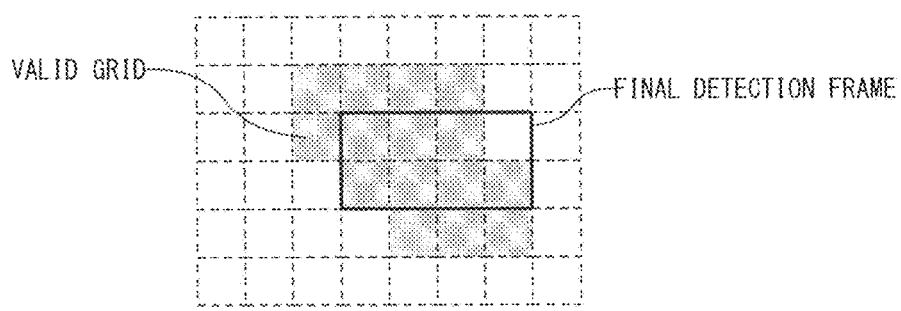
FIG. 15D is an explanatory drawing showing an example of a final detection frame that is determined based on the plurality of valid detection frames.

FIG. 15A is an explanatory drawing showing an example of valid grids that are set in the frame grid. FIG. 15B is an explanatory diagram illustrating a condition for extracting a valid detection frame. FIG. 15C is an explanatory drawing showing an example of a plurality of valid detection frames that were extracted. FIG. 15D is an explanatory drawing showing an example of a final detection frame that is determined based on the plurality of valid detection frames. A valid grid is a grid with a high value among the respective grids of the frame grid obtained in step S22 (or in step S24 in a case where steps S23 and S24 were executed). FIG. 15A illustrates an example of a case where grids with the value of three or more in the frame grid after expansion that is shown in FIG. 14 are adopted as valid grids.

A valid detection frame is a provisional detection frame that overlaps with a valid grid among the provisional detection frames. FIG. 15B illustrates an example of a case where in-frame confirmation positions are set at four places in a provisional detection frame. The final detection unit 24, for example, adopts a provisional detection frame as a valid detection frame in which a predetermined number or more (for example, three or more) of the in-frame confirmation positions overlap with a valid grid. The in-frame confirmation positions, for example, may be the four corners of the provisional detection frame or midpoints of the four sides or the like. Further, the number of in-frame confirmation positions need not be four, and for example, only one position may be adopted as an in-frame confirmation position (for example, only a center position).

In addition, the valid detection frames may be subjected to a further selection process based on the similarity of the size or position thereof to other valid detection frames. For example, valid detection frames may be selected whose sizes are within a range from a multiple of 1/1.5 times or more to less than a multiple of 1.5 times the average value of a plurality of valid detection frames, and of which a predetermined proportion or more overlap with each other (for example, valid detection frames in which the respective centers do not deviate with respect to each other by an amount corresponding to one half or more of the size of the valid detection frame). The positions and sizes of valid detection frames selected in this manner will be approximately the same.

Next, in step S26, the final detection unit 24 determines a final detection frame (final detection position) based on the plurality of valid detection frames. More specifically, the final detection unit 24 may determine a valid detection frame that has the highest likelihood among the plurality of valid detection frames as being the final detection frame, or may determine the final detection frame by subjecting the plurality of valid detection frames to weighted-addition averaging (weighted averaging) using the respective likelihoods thereof.

In the case of performing weighted averaging, if the obtained number of valid detection frames to be subjected to the weighted averaging is not greater than a predetermined number (for example, two), these frames may be treated as invalid and the final detection unit 24 may not determine the final detection frame.

Weighted averaging may be performed using a final detection frame that was obtained by weighted averaging in the past. In some cases the position of a final detection frame obtained in the past is a position that, in the current frame image, has been shifted relative to the past position due to movement.

Therefore, the position of the final detection frame obtained in the past may be shifted using an optical flow based on the centers of the final detection frames of the past and the current or based on averaging them. The size of the final detection frame obtained in the past may be altered in accordance with a ratio between shifted distances of the centers and the upper centers or ratio between shifted distances of ends on the right sides and ends on the left. The ratio between the shifted distances may also be calculated by averaging or a least-squares method using an entire region obtained with the final detection frame. By utilizing a past final detection frame, even if the current provisional detection frames vary in the positions, the current provisional detection frames are smoothed to a certain extent. Further, in a case where a final detection frame cannot be obtained with the current frame image (for example, the detection is considered invalid because two or more valid detection frames are not obtained), past final detection frame may be held for a predetermined number of frame images (for example, three frame images). Furthermore, in some cases a small weighted average result appears among large weighted average results. In such a case the small weighted average result is deleted.

Figure 16:
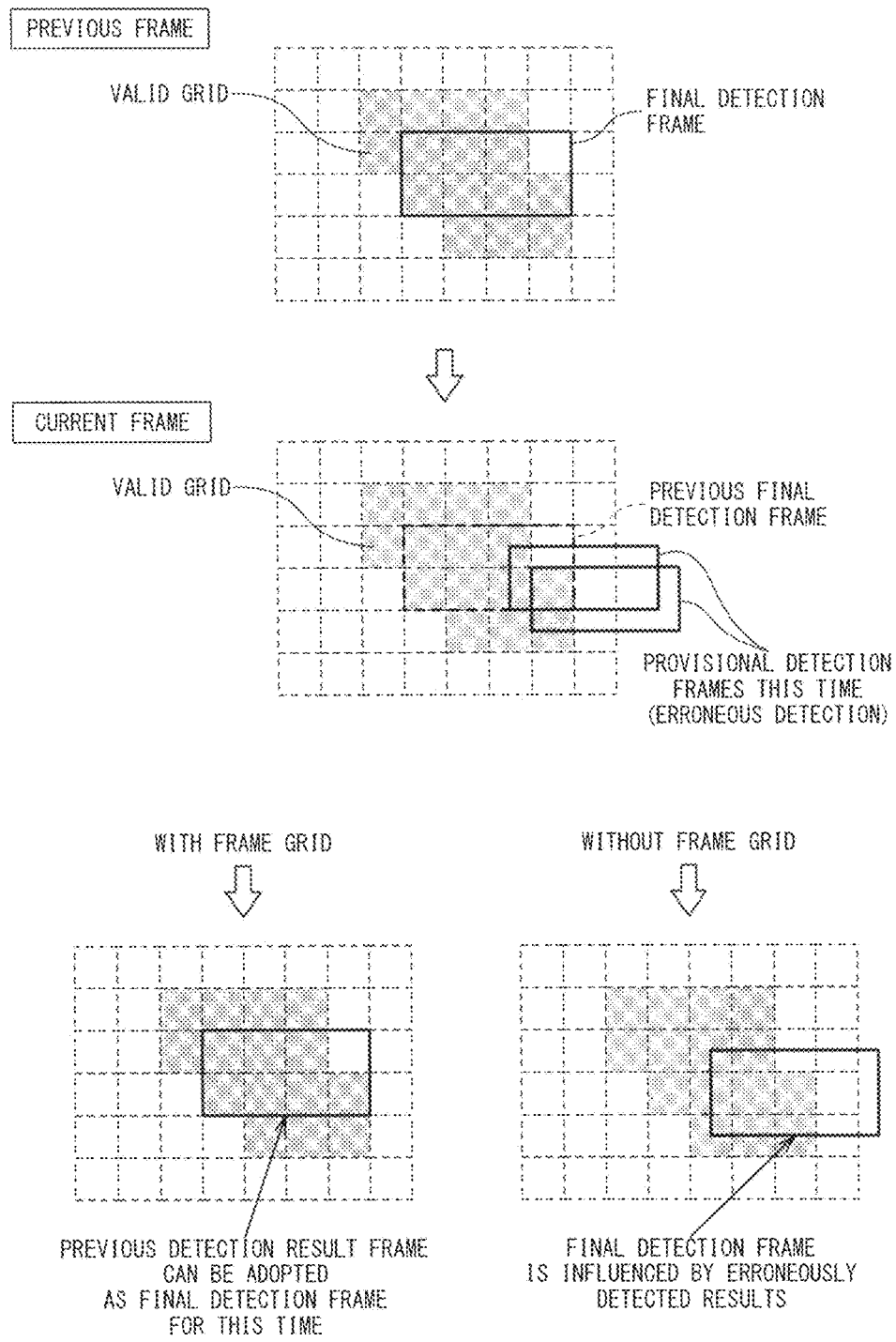
FIG. 16 is an explanatory drawing illustrating an example of a difference between a final detection frame determined by extracting valid detection frames using valid grids, and a final detection frame determined without using valid grids.

FIG. 16 is an explanatory drawing illustrating an example of a difference between a final detection frame that is determined by extracting valid detection frames using valid grids, and a final detection frame that is determined without using valid grids.

As shown in FIG. 16, a case is assumed in which a valid detection frame is not obtained with the current frame image. In this case, a provisional detection frame that was erroneously detected is also used to determine the final detection frame when valid grids are not used. When the frame grid is considered and valid grids are used as the present embodiment, by contrast, a provisional detection frame that was erroneously detected is not selected as a valid detection frame, and therefore determination of a final detection frame is not performed, and it is easy to use a correct final detection frame determined in the past as the final detection frame for the current detection.

According to the procedures shown in FIG. 9, the final detection unit 24 can determine an overlapping region among a plurality of normalized provisional detection frames (position candidate regions) on a certain single processed image, and determine a final detection frame based on the overlapping region and the plurality of provisional detection frames.

The image processing apparatus 10 according to the present embodiment can generate a count grid in which an overlapping region (density) among a plurality of provisional detection frames (position candidate regions) is reflected, and determine a final detection frame based on the count grid and the plurality of provisional detection frames. Therefore, even in a case where the shape of the detection target object 42 in the processed image changes, the image processing apparatus 10 can accurately detect the detection target object 42 while reducing the occurrence of an erroneous detection.

Further, the image processing apparatus 10 can extract a plurality of valid position candidate regions (valid detection frames) from among a plurality of provisional detection frames of the current frame image by using a frame grid in which a history (temporal continuity) of overlapping regions in a plurality of past frame images and the current frame image are reflected. Consequently, detection of the detection target object 42 can be limited to positions at which there is a high possibility that the detection target object 42 exists, and the occurrence of an erroneous detection can be further reduced.

In addition, the image processing apparatus 10 can expand the frame grid using an optical flow between the previous frame image and the current frame image, and can determine the final detection frame using the expanded frame grid. Therefore, even in a case where the detection target object 42 moves quickly, the image processing apparatus 10 can reliably and stably determine the final detection frame.

Second Embodiment

Next, a second embodiment of the image processing apparatus and the image processing method according to the present invention will be described.

The image processing apparatus 10 according to the second embodiment differs from the image processing apparatus 10 according to the first embodiment in the respect that the image processing apparatus 10 according to the second embodiment generates a plurality of count grids and frame grids in accordance with a distance from the own vehicle 41, and the final detection unit 24 performs three-dimensional processing. The procedures until the processing executed by the provisional detection unit 23 are the same as those performed by the image processing apparatus 10 according to the first embodiment, and hence a description of those procedures is omitted here.

According to the present embodiment, a configuration is considered in which a plurality of processed images of the image pyramid 50 are classified into a plurality of categories in accordance with the relevant enlargement/reduction ratios, that is, in accordance with a distance from the own vehicle 41. A count grid (three-dimensional count grid) and a frame grid (three-dimensional frame grid) are obtained for each of the categories.

First, count grid generation processing according to the present embodiment will be described.

Figure 17:
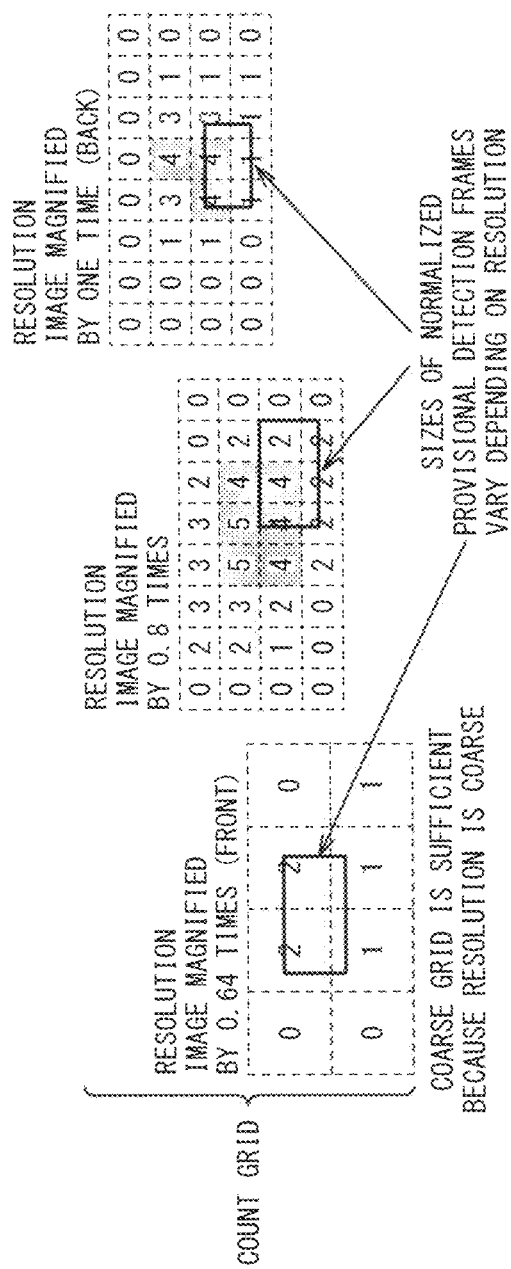
FIG. 17 is an explanatory drawing illustrating an example of some of a plurality of count grids generated in accordance with a distance from the own vehicle.

FIG. 17 is an explanatory drawing illustrating an example of some of a plurality of count grids generated in accordance with a distance from the own vehicle 41.

The final detection unit 24 may generate a count grid (and frame grid) for each processed image of the image pyramid 50, or may prepare count grids (and frame grids) of a number that is less than the number of processed images. Further, because the resolution is coarse in the processed images of the image pyramid 50 in the proximity of the own vehicle 41, the grids of the count grid (and frame grid) corresponding to the proximity of the own vehicle 41 may be coarsened.

In the case of creating three-dimensional count grids in the depth direction, the resolutions of the image grids of the respective count grids are different. Therefore, the sizes of the normalized provisional detection frames in the respective image grids also differ. As shown in FIG. 17, the final detection unit 24 increments the values of the respective three-dimensional count grids that were obtained by dividing in the depth direction, in accordance with the sizes of the provisional detection frames. At this time, the final detection unit 24 may also increment the values of grids at several depths before and after (for example, one before and one after) the count grid at the most suitable depth among the three-dimensional count grids (e.g. the count grid where the valid detection frame having the highest likelihood among the count grids is detected).

In this case, the maximum speed of the detection target object 42 may be set in advance, and the relevant count grids before and after that are within a distance that corresponds to the maximum speed may be incremented by amounts that progressively increase as the distance between count grids. Further, a past movement speed may be calculated in advance, and addition may be performed with respect to grids at several depths before and after a grid that is shifted by an amount corresponding to the speed.

Similarly to the count grids, the frame grids are three-dimensional frame grids that are obtained by dividing in the depth direction. Since the processing to update a frame grid is the same as the processing performed by the image processing apparatus 10 according to the first embodiment, a description thereof is omitted here (for example, addition/subtraction values are determined for each grid of a corresponding frame grid in accordance with the values of the respective grids of the count grid; see FIGS. 12 and 13).

Next, expansion processing for a frame grid according to the present embodiment will be described.

FIG. 18A is an explanatory drawing illustrating an example of an optical flow. FIG. 18B is an explanatory drawing illustrating an example of the manner in which a frame grid is expanded using the optical flow shown in FIG. 18a according to the second embodiment.

First, an optical flow between the previous (immediately preceding) frame image and the current frame image is acquired in a predetermined processed image of the image pyramid 50.

Note that it is not necessary to determine an optical flow for each processed image in which the depth is different because processed images in which the depth is different are originally the same picked-up image in which only the resolution or size is different. Therefore, an optical flow that is determined based on a predetermined processed image may be normalized and used for other processed images.

The expansion processing for a frame grid in the present embodiment requires expansion to be performed not only in the time dimension, but also in the depth direction. Therefore, the following processing is added to the processing according to the first embodiment.

Grids for which a value is not 0 among the grids of a frame grid are grids to which a valid detection frame belonged. Expansion processing is performed with respect to each of the valid detection frames, or with respect to each frame obtained by subjecting valid detection frames that are close to each other to weighted averaging.

Rates of magnification can be obtained by utilizing results for the center or edges of valid detection frames. At this time, errors may be decreased by determining a rate of magnification for each of a plurality of valid detection frames and by utilizing values obtained by applying the least-squares method or the like to the determined rate of magnifications.

When a rate of magnification is equal to or greater than a predetermined value (for example, a rate of 1.1 times), values of grids at the back to which a current valid detection frame of the back belong are expanded to the corresponding grids of the front frame grid. The values of the grids at the back, the corresponding gird of the front to which a current valid detection frame of the front belong, are also expanded to the corresponding grids of the front frame grid, i.e., expanded to the grids of the current valid detection frames of the front. Similarly, when the rate of magnification is less than or equal to a certain value (for example, a rate of 1/1.1 times), in the direction from the front towards the back, values of grids at the front to which a valid detection frame of the front belong are expanded to the corresponding grids of the back frame grid, and the values of the grids at the front, the corresponding gird of the back to which a valid detection frame of the back belong, are also expanded to the corresponding grids of the back frame grid.

Further, in a case where rates of magnification or rate of reductions differ greatly from a multiple of one, a value at a grid position of a valid detection frame may be expanded to a grid that matches a previous scaling factor that straddles a plurality of grids, and a value of a grid that matches the previous scaling factor that straddles a plurality of grids may be expanded to a grid position of a valid detection frame. In this case, a range of depths (0.8 times to 1.2 times or the like) may be defined based on the rate of magnification so as to expand the results at grid positions of current valid detection frames to neighboring grids before and after the relevant grid positions, and results may be expanded to grids within this range.

Further, a value of the grid can be expanded from a position that was shifted by an amount corresponding to the optical flow. Furthermore, not only a frame grid at a depth at which a valid detection frame was obtained, but also a frame grid at a depth at which a valid detection frame was not obtained may be expanded as having the same rate of magnification.

After executing expansion processing for frame grids, the final detection unit 24 selects grids that most match the size of the provisional detection frames and selects valid detection frames according to the similarity of positions or sizes of the provisional detection frames using the valid grids of the frame grid at that depth. The final detection unit 24 then determines a final detection frame by subjecting the selected valid detection frames to weighted-addition averaging using the respective likelihoods thereof. In the weighted averaging at this time, even if the depths are different, it is favorable to adopt results that were obtained with grids at depths that are close to each other as a single result.

The image processing apparatus 10 according to the second embodiment provides similar effects as the image processing apparatus 10 according to the first embodiment. Further, according to the image processing apparatus 10 of the second embodiment, since confirmation in the depth direction is enabled, erroneous detection of results for which the depth is different can be prevented.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the scope of the invention as defined by the appended claims. The accompanying claims and their equivalents are intended to cover such forms or modifications as would fall within the scope of the invention as defined by the appended claims.

For example, the size or shape of a provisional detection frame may be arbitrarily changed with respect to a scanning frame depending on the type of the detection target object 42. The final detection frame can be determined more quickly and with greater accuracy by changing the size of a provisional detection frame with respect to the scanning frame such that the width of the provisional detection frame increases as the movement speed of the detection target object 42 increases, and such that the width of the provisional detection frame decreases as the movement speed of the detection target object 42 decreases.

When the shape of the scanning frame is vertically long and has a narrow width for example, such as when the detection target object is a person, there are many cases where, among the frame images, the scanning frames will not overlap with each other in the width direction when the detection target object 42 has moved, and it will be difficult for the counts of the frame grids to increase even if expansion processing according to the optical flow is performed.

Therefore, the shape of a provisional detection frame may be altered depending on the ease with which the detection target object 42 can move in the processed images. For example, in a case where the detection target object 42 is an object that is liable to move by a large amount in the lateral direction and by a small amount in the longitudinal direction in the processed images, and the provisional detection frame is vertically long, it is favorable to convert the shape of the provisional detection frame to a horizontally long shape.

Further, when changing the shape of provisional detection frames, the center position may be at the same position as before the shape is changed. The provisional detection frame of changed shape may be shifted based on a predetermined ratio so as to be at a duplicate position before and after the changes of the shape even if the respective depths of the processed images are different. In this case, the provisional detection frame may be shifted such that a center position in the longitudinal direction is in the vicinity of a position on a horizontal line. Further, a shape after changing the shape of the provisional detection frames is not limited to a rectangular shape, and may also be an elliptical shape or a triangular shape.

Furthermore, in a case where the own vehicle 41 turns or the like, the lateral amount of movement with respect to the size of the detection target object decreases progressively in accordance with the proximity of the detection target object 42. Therefore, the shape of provisional detection frames may be altered depending on the size in the processed image or depth. By generating a count grid in this manner, an overlapping region can be secured and the detection accuracy of the final detection frame can be maintained. In addition, by reducing the width of provisional detection frames in a direction in which the amount of movement with respect to the size of the detection target object is small, the calculation load relating to identification of grids to which provisional detection frames belong can be reduced. Further, in a case where it is known that the detection target object 42 does not move in the longitudinal direction, the calculation load relating to identification of grids to which provisional detection frames belong can be reduced by employing one grid as the number of grids in the longitudinal direction. The same applies with respect to the lateral direction also.

Further, a picked-up image that the image processing apparatus 10 utilizes may be not only an image that was picked up by the camera 11 provided in the vehicle, but may also be an image that was picked up by a common periphery monitoring camera such as a camera installed on a street light.

The invention claimed is:

1. An image processing apparatus, comprising:
a processed image generation unit configured to acquire an image around a vehicle picked up by a camera provided on the vehicle, and generate a processed image from the image for target object detection processing;
a provisional detection unit configured to scan a scanning frame of a predetermined size according to a detection target object on the processed image, and detect a plurality of position candidate regions of the detection target object within the processed image by determining a feature value for respective scanning positions using a dictionary of the detection target object; and
a final detection unit configured to determine an overlapping region of the plurality of position candidate regions, and determine a final detection position of the detection target object within the processed image based on the overlapping region and the plurality of position candidate regions.

2. The apparatus according to claim 1, wherein:
the final detection unit determines the final detection position of the detection target object within the processed image based on a history of overlapping regions in a current frame image and a past plurality of frame images, and the plurality of position candidate regions of the current frame.

3. The apparatus according to claim 1, wherein:
the provisional detection unit determines a likelihood using the dictionary for each scanning position of the scanning frame of the predetermined size, and detects scanning position for which a likelihood is greater than or equal to a predetermined likelihood as the plurality of position candidate regions; and
the final detection unit extracts a plurality of valid position candidate regions from the plurality of position candidate regions of a current frame image based on a history of overlapping regions in a current frame and a past plurality of frames, and determines the final detection position by subjecting the plurality of valid position candidate regions to weighted-addition averaging using respective likelihoods of the plurality of valid position candidate regions.

4. The apparatus according to claim 3, wherein:
the provisional detection unit changes the predetermined likelihood for each scanning position of the scanning frame of the predetermined size based on the history of the overlapping regions.

5. The apparatus according to claim 1, wherein:
the processed image generation unit generates a plurality of processed images by scaling the image picked up the camera so as to cause the plurality of processed images to have a different scaling factor to each other while each of the plurality of processed images having a predetermined visual axis as a normal-line direction;
the provisional detection unit classifies the plurality of processed images into a plurality of categories according to the scaling factor, and detects the position candidate regions for each category; and
the final detection unit determines the overlapping region, for each category, of the plurality of position candidate regions, and determines the final detection position based on histories of overlapping regions in a current frame image and a past plurality of frame images, each history being corresponding to each category.

6. The apparatus according to claim 1, wherein:
the final detection unit corrects the overlapping region using an optical flow between an immediately preceding frame image and a current frame image, and determines the final detection position using corrected overlapping region.

7. The apparatus according to claim 1, wherein:
the final detection unit changes a shape of the plurality of position candidate regions detected by the provisional detection unit in accordance with a type of the detection target object, and thereafter determines the overlapping region.

8. The apparatus according to claim 1, further comprising:
a dictionary generation unit configured to generate the dictionary as a single dictionary in advance using a plurality of images of the detection target object picked up in advance by the camera, the plurality of images being obtained by arranging the detection target object at a corresponding plurality of positions in a predetermined range within an image-pickup range of the camera so as to make a predetermined visual axis of the camera and a normal-line direction of a detection target surface of the detection target object parallel to each other and being obtained by picking up each of the plurality of images by the camera at the corresponding plurality of positions,
wherein the processed image generation unit generates as the processed image an image having the predetermined visual axis as a normal-line direction, based on an image that is picked up by the camera after generation of the dictionary.

9. The apparatus according to claim 8, wherein:
the provisional detection unit detects the plurality of position candidate regions using the dictionary based on a HOG feature value.

10. The apparatus according to claim 1, further comprising:
a warning unit configured to notify a driver of the vehicle of information regarding a final detection position that is detected by the final detection unit using at least one of an audio output through a speaker of the vehicle, a buzzer output through the speaker of the vehicle, and a warning display on a display apparatus provided at a position recognizable to the driver.

11. An image processing method comprising:
acquiring an image around a vehicle picked up by a camera provided on the vehicle;
generating a processed image from the image for target object detection processing;
scanning a scanning frame of a predetermined size according to a detection target object on the processed image;
detecting a plurality of position candidate regions of the detection target object within the processed image by determining a feature value for respective scanning positions using a dictionary of the detection target object;

determining an overlapping region of the plurality of position candidate regions; and determining a final detection position of the detection target object within the processed image based on the overlapping region and the plurality of position candidate regions.

12. A non-transitory computer readable medium having instructions stored therein causes, when executed by a computer, to execute the steps of the method according to claim 11.

* * * * *